US012694784B2

(12) United States Patent
Sun et al.

(10) Patent No.: US 12,694,784 B2
(45) Date of Patent: Jul. 28, 2026

(54) METHOD AND APPARATUS FOR CONTROLLING TRAFFIC LIGHT

(71) Applicant: Beijing Baidu Netcom Science Technology Co., Ltd., Beijing (CN)

(72) Inventors: Qian Sun, Beijing (CN); Le Zhang, Beijing (CN); Jingbo Zhou, Beijing (CN); Hui Xiong, Beijing (CN); Weijia Zhang, Beijing (CN); Huan Yu, Beijing (CN); Yu Mei, Beijing (CN); Weicen Ling, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 247 days.

(21) Appl. No.: 18/503,538

(22) Filed: Nov. 7, 2023

(65) Prior Publication Data

US 2024/0071222 A1     Feb. 29, 2024

(30) Foreign Application Priority Data

May 6, 2023     (CN) .......................... 202310506070.3

(51) Int. Cl.
| | |
|---|---|
| *G08G 1/0967* | (2006.01) |
| *G06N 20/00* | (2019.01) |
| *G08G 1/081* | (2006.01) |
| *B60W 60/00* | (2020.01) |
| *G06F 16/35* | (2019.01) |

(52) U.S. Cl.
CPC ....... *G08G 1/096725* (2013.01); *G06N 20/00* (2019.01); *G08G 1/081* (2013.01); *G08G 1/096766* (2013.01); *B60W 60/001* (2020.02); *B60W 2555/60* (2020.02); *G06F 16/35* (2019.01)

(58) Field of Classification Search
CPC ......................... G06N 20/00; G08G 1/096725
See application file for complete search history.

(56) References Cited

U.S. PATENT DOCUMENTS

2024/0331535 A1* 10/2024 Quirynen ............. G08G 1/0112
2025/0299569 A1*  9/2025 Mousapoursiahgourab ................
                                           G08G 1/0145

* cited by examiner

*Primary Examiner* — Jess Whittington
(74) *Attorney, Agent, or Firm* — Seed Intellectual Property Law Group LLP

(57) ABSTRACT

A method for controlling a traffic light, a method and apparatus for navigating an unmanned vehicle and a method and apparatus for training a model are provided. An implementation comprises: generating a reinforced traffic light state parameter according to vehicle state representation information of an unmanned vehicle currently contained in a preset area of a target traffic light and a current traffic light state parameter of the target traffic light; and generating a traffic light control action according to the reinforced traffic light state parameter; where the reinforced traffic light state parameter is used to cause an unmanned vehicle navigation end to generate a reinforced vehicle state parameter according to a reinforced traffic light state and a current vehicle state parameter of a target unmanned vehicle, and generate an unmanned vehicle navigation action according to the reinforced vehicle state parameter.

18 Claims, 10 Drawing Sheets

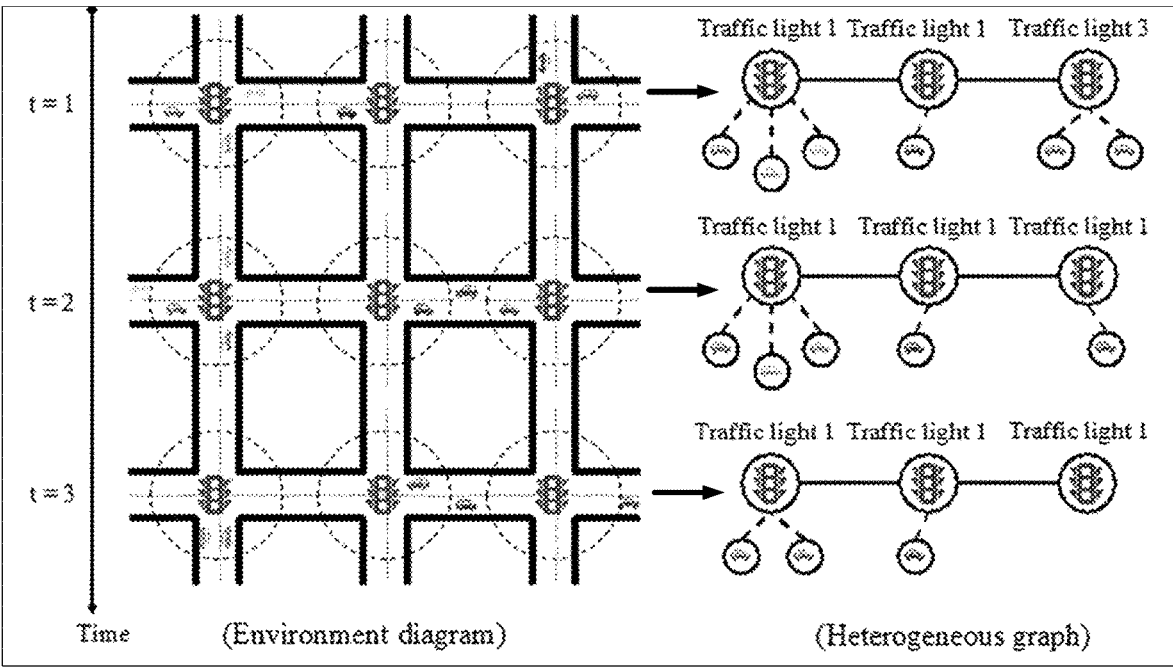

Generate a reinforced traffic light state parameter, according to vehicle state representation information of an unmanned vehicle currently contained in a preset area of a target traffic light and a current traffic light state parameter of the target traffic light

S102

Generate, according to the reinforced traffic light state parameter, a traffic light control action matching the reinforced traffic light state parameter

Fig. 2

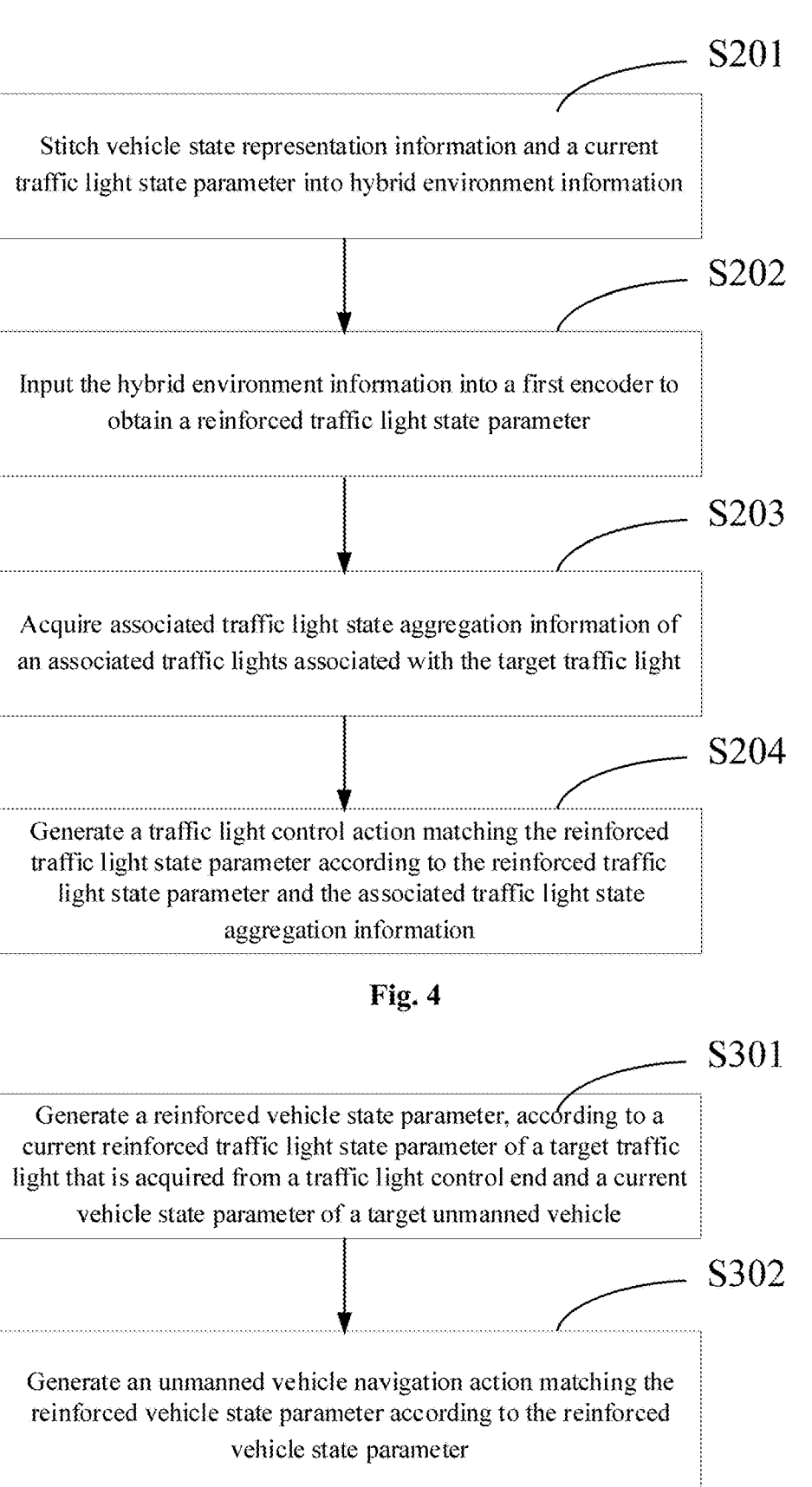

S201

Stitch vehicle state representation information and a current traffic light state parameter into hybrid environment information

S202

Input the hybrid environment information into a first encoder to obtain a reinforced traffic light state parameter

S203

Acquire associated traffic light state aggregation information of an associated traffic lights associated with the target traffic light

S204

Generate a traffic light control action matching the reinforced traffic light state parameter according to the reinforced traffic light state parameter and the associated traffic light state aggregation information

Generate a reinforced vehicle state parameter, according to a current reinforced traffic light state parameter of a target traffic light that is acquired from a traffic light control end and a current vehicle state parameter of a target unmanned vehicle

S302

Generate an unmanned vehicle navigation action matching the reinforced vehicle state parameter according to the reinforced vehicle state parameter

Fig. 5

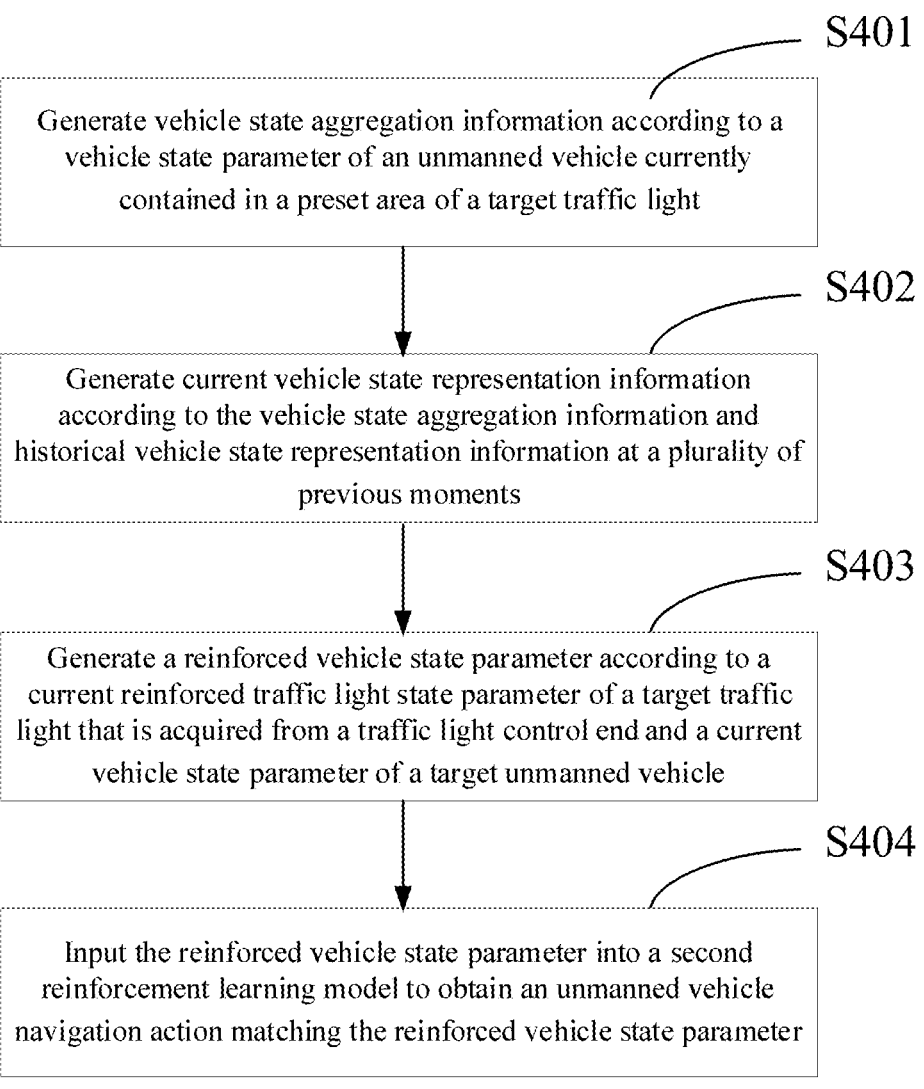

S401

Generate vehicle state aggregation information according to a vehicle state parameter of an unmanned vehicle currently contained in a preset area of a target traffic light

S402

Generate current vehicle state representation information according to the vehicle state aggregation information and historical vehicle state representation information at a plurality of previous moments

S403

Generate a reinforced vehicle state parameter according to a current reinforced traffic light state parameter of a target traffic light that is acquired from a traffic light control end and a current vehicle state parameter of a target unmanned vehicle

S404

Input the reinforced vehicle state parameter into a second reinforcement learning model to obtain an unmanned vehicle navigation action matching the reinforced vehicle state parameter

Fig. 6

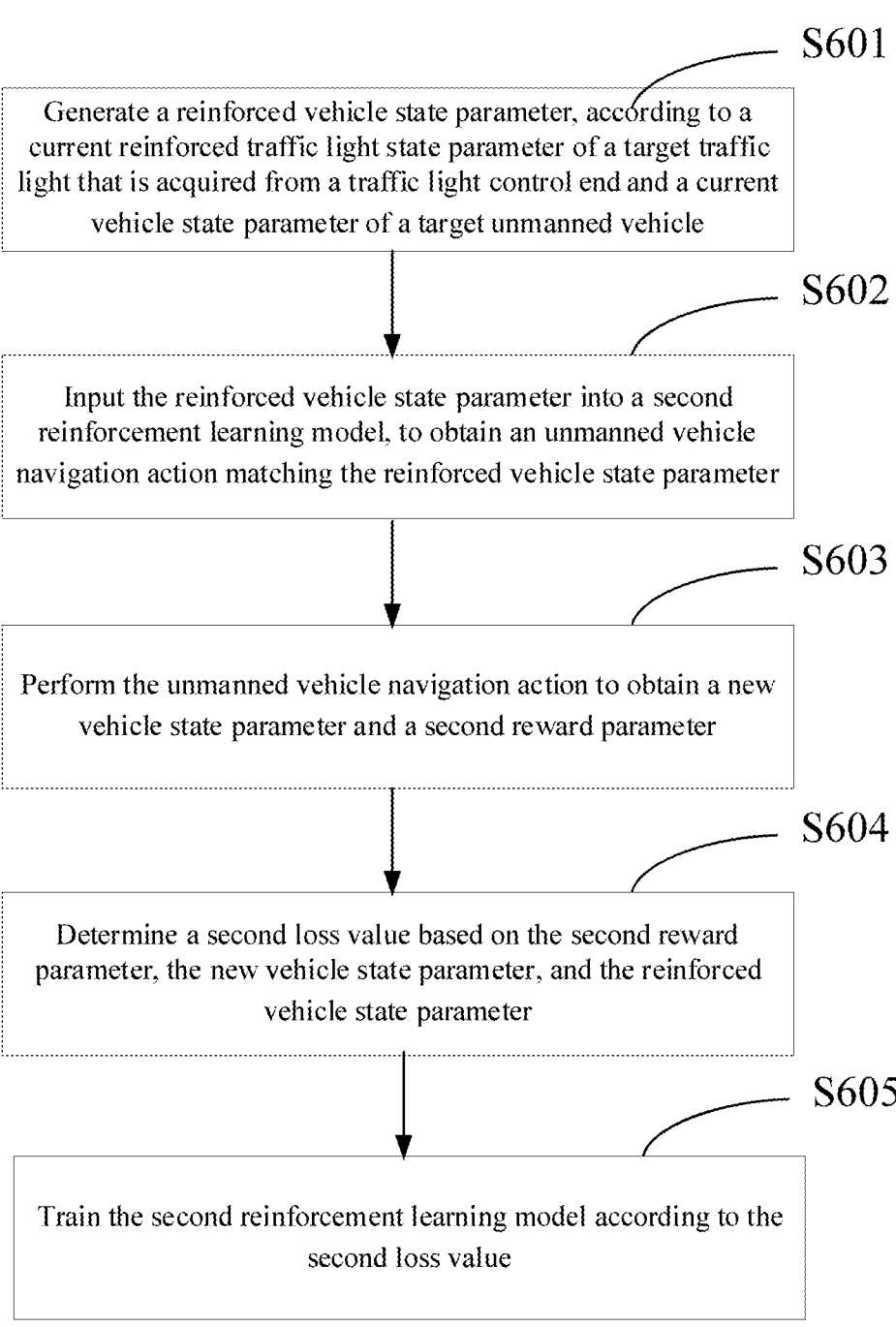

S601

Generate a reinforced vehicle state parameter, according to a current reinforced traffic light state parameter of a target traffic light that is acquired from a traffic light control end and a current vehicle state parameter of a target unmanned vehicle

S602

Input the reinforced vehicle state parameter into a second reinforcement learning model, to obtain an unmanned vehicle navigation action matching the reinforced vehicle state parameter

S603

Perform the unmanned vehicle navigation action to obtain a new vehicle state parameter and a second reward parameter

S604

Determine a second loss value based on the second reward parameter, the new vehicle state parameter, and the reinforced vehicle state parameter

S605

Train the second reinforcement learning model according to the second loss value

Fig. 8

METHOD AND APPARATUS FOR CONTROLLING TRAFFIC LIGHT

CROSS-REFERENCE TO RELATED APPLICATIONS

This application claims the priority from Chinese Patent Application No. 202310506070.3, filed in the National Intellectual Property Administration (CNIPA) on May 6, 2023, the contents of which are hereby incorporated by reference in their entirety.

TECHNICAL FIELD

The present disclosure relates to the field of computer technology, and particular to a method and apparatus for controlling a traffic light, a method and apparatus for navigating an unmanned vehicle and a method and apparatus for training a model.

BACKGROUND

In recent years, with the rapid development of autonomous driving technology, 5G communication and Internet-of-Vehicle technology, more and more intelligent traffic lights and unmanned vehicles have been put into actual traffic. Generally, the intelligent traffic lights can make a decision on a turning-on action of a green light according to the vehicle flow situation on a road; and the unmanned vehicles can make a decision on a steering action according to a navigation path.

SUMMARY

Embodiments of the present disclosure provides a method and apparatus for controlling a traffic light, a method and apparatus for navigating an unmanned vehicle and a method and apparatus for training a model that are used for solving at least one of the above technical problems.

An aspect of the present disclosure provides a method for controlling a traffic light, applied to a traffic light control end communicating with an unmanned vehicle navigation end, the method comprises:

generating a reinforced traffic light state parameter according to vehicle state representation information of an unmanned vehicle currently contained in a preset area of a target traffic light and a current traffic light state parameter of the target traffic light;

generating, according to the reinforced traffic light state parameter, a traffic light control action matching the reinforced traffic light state parameter;

where the reinforced traffic light state parameter is used to cause the unmanned vehicle navigation end to: generate a reinforced vehicle state parameter according to the reinforced traffic light state and a current vehicle state parameter of a target unmanned vehicle, and generate an unmanned vehicle navigation action matching the reinforced vehicle state parameter according to the reinforced vehicle state parameter.

Another aspect of the present disclosure provides a method for navigating an unmanned vehicle, applied to an unmanned vehicle navigation end communicating with a traffic light control end, the method comprises:

generating a reinforced vehicle state parameter according to a current reinforced traffic light state parameter of a target traffic light that is acquired from the traffic light control end and a current vehicle state parameter of a target unmanned vehicle;

generating, according to the reinforced vehicle state parameter, an unmanned vehicle navigation action matching the reinforced vehicle state parameter, where the traffic light control end generates the reinforced traffic light state parameter according to the method described above.

Another aspect of the present disclosure provides a method for training a model, the method includes:

generating a reinforced traffic light state parameter according to vehicle state representation information of an unmanned vehicle currently contained in a preset area of a target traffic light and a current traffic light state parameter of the target traffic light;

inputting the reinforced traffic light state parameter into a first reinforcement learning model, to obtain a traffic light control action matching the reinforced traffic light state parameter;

performing the traffic light control action, to obtain a new traffic light state parameter and a first reward parameter;

determining a first loss value, based on the first reward parameter, the new traffic light state parameter, and the reinforced traffic light state parameter; and training the first reinforcement learning model according to the first loss value.

Another aspect of the present disclosure provides a method for training a model. The method includes:

generating a reinforced vehicle state parameter, according to a current reinforced traffic light state parameter of a target traffic light that is acquired from a traffic light control end and a current vehicle state parameter of a target unmanned vehicle;

inputting the reinforced vehicle state parameter into a second reinforcement learning model, to obtain an unmanned vehicle navigation action matching the reinforced vehicle state parameter;

performing the unmanned vehicle navigation action, to obtain a new vehicle state parameter and a second reward parameter;

determining a second loss value, based on the second reward parameter, the new vehicle state parameter and the reinforced vehicle state parameter;

training the second reinforcement learning model according to the second loss value.

Another aspect of the present disclosure provides an apparatus for controlling a traffic light. The apparatus includes:

a reinforced traffic light state generating module, configured to generate a reinforced traffic light state parameter according to vehicle state representation information of an unmanned vehicle currently contained in a preset area of a target traffic light and a current traffic light state parameter of the target traffic light; and a traffic light control action generating module, configured to generate a traffic light control action matching the reinforced traffic light state parameter according to the reinforced traffic light state parameter;

where the reinforced traffic light state parameter is used to cause the unmanned vehicle navigation end to: generate a reinforced vehicle state parameter according to the reinforced traffic light state and a current vehicle state parameter of a target unmanned vehicle, and generate an unmanned vehicle navigation action matching the reinforced vehicle state parameter according to the reinforced vehicle state parameter.

Another aspect of the present disclosure provides an apparatus for navigating an unmanned vehicle. The apparatus includes:

a reinforced unmanned vehicle state generating module, configured to generate a reinforced vehicle state parameter according to a current reinforced traffic light state parameter of a target traffic light that is acquired from a traffic light control end and a current vehicle state parameter of a target unmanned vehicle; and an unmanned vehicle navigation action generating module, configured to generate an unmanned vehicle navigation action matching the reinforced vehicle state parameter according to the reinforced vehicle state parameter;

where the traffic light control end generates the reinforced traffic light state parameter according to the method for controlling a traffic light described above.

Another aspect of the present disclosure provides an apparatus for training a model. The apparatus includes:

a first parameter generating module, configured to generate a reinforced traffic light state parameter according to vehicle state representation information of an unmanned vehicle currently contained in a preset area of a target traffic light and a current traffic light state parameter of the target traffic light;

a first action generating module, configured to input the reinforced traffic light state parameter into a first reinforcement learning model to obtain a traffic light control action matching the reinforced traffic light state parameter;

a first performing module, configured to perform the traffic light control action to obtain a new traffic light state parameter and a first reward parameter;

a first loss value determining module, configured to determine a first loss value based on the first reward parameter, the new traffic light state parameter, and the reinforced traffic light state parameter;

a first training module, configured to train the first reinforcement learning model according to the first loss value.

Another aspect of the present disclosure provides an apparatus for training a model. The apparatus includes:

a second parameter generating module, configured to generate a reinforced vehicle state parameter according to a current reinforced traffic light state parameter of a target traffic light that is acquired from a traffic light control end and a current vehicle state parameter of a target unmanned vehicle;

a second action generating module, configured to input the reinforced vehicle state parameter into a second reinforcement learning model, to obtain an unmanned vehicle navigation action matching the reinforced vehicle state parameter;

a second performing module, configured to perform the unmanned vehicle navigation action, to obtain a new vehicle state parameter and a second reward parameter;

a second loss value determining module, configured to determine a second loss value based on the second reward parameter, the new vehicle state parameter and the reinforced vehicle state parameter;

a second training module, configured to train the second reinforcement learning model according to the second loss value.

Another aspect of the present disclosure provides an electronic device. The electronic device includes:

at least one processor; and a memory, communicating with the at least one processor, where the memory stores instructions executable by the at least one processor, and the instructions are executed by the at least one processor, to enable the at least one processor to perform the method for controlling a traffic light, the method for navigating an unmanned vehicle, the methods for training models described above.

Another aspect of the present disclosure provides a non-transitory computer readable storage medium, storing a computer instruction, wherein the computer instruction is used to cause a computer to perform the method for controlling a traffic light, the method for navigating an unmanned vehicle, the methods for training models described above.

Another aspect of the present disclosure provides a computer program product, comprising a computer program, wherein the computer program, when executed by a processor, implements the method for controlling a traffic light, the method for navigating an unmanned vehicle, the methods for training models described above.

It should be understood that the content described in this part is not intended to identify key or important features of the embodiments of the present disclosure, and is not used to limit the scope of the present disclosure. Other features of the present disclosure will be easily understood through the following description.

BRIEF DESCRIPTION OF THE DRAWINGS

The accompanying drawings are used for a better understanding of the scheme, and do not constitute a limitation to the present disclosure. Here:

FIG. 1 illustrates an example traffic environment heterogeneous graph of the present disclosure;

FIG. 2 is a schematic flowchart of a method for controlling a traffic light provided in a first embodiment of the present disclosure;

FIG. 4 is a schematic flowchart of a method for controlling a traffic light provided in a second embodiment of the present disclosure;

FIG. 5 is a schematic flowchart of a method for navigating an unmanned vehicle provided in a third embodiment of the present disclosure;

FIG. 6 is a schematic flowchart of a method for navigating an unmanned vehicle provided in a fourth embodiment of the present disclosure;

FIG. 8 is a schematic flowchart of a method for training a model provided in a sixth embodiment of the present disclosure;

DETAILED DESCRIPTION OF EMBODIMENTS

Figure 3:
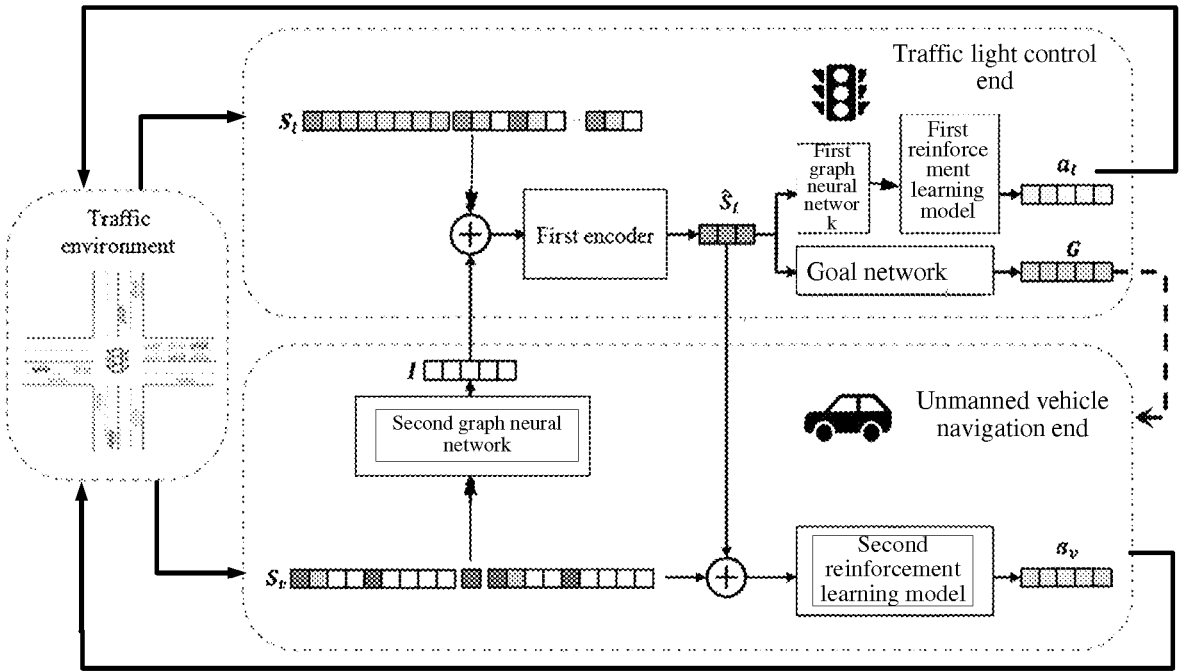
FIG. 3 is an example application environment framework diagram.

Example embodiments of the present disclosure are described below in combination with the accompanying drawings, and various details of the embodiments of the present disclosure are included in the description to facilitate understanding, and should be considered as example only. Accordingly, it should be recognized by those of ordinary skill in the art that various changes and modifications may be made to the embodiments described herein without departing from the scope and spirit of the present disclosure. Also, for clarity and conciseness, descriptions for well-known functions and structures are omitted in the following description.

Embodiments in the present disclosure and the features in the embodiments may be combined with each other on a non-conflict basis.

As used herein, the term "and/or" includes any and all combinations of one or more of the associated listed items.

The term used herein is for the purpose of describing embodiments only and is not intended to limit the scope of the present disclosure. As used herein, the singular forms "a" and "this" are intended to include the plural forms as well, unless the context clearly indicates otherwise.

Unless otherwise defined, all terms (including technical and scientific terms) used herein have the same meaning as commonly understood by those of ordinary skill in the art to which the present disclosure belongs. It should be further understood that terms (e.g., those defined in commonly used dictionaries) should be interpreted as having a meaning that is consistent with their meaning in the contexts of the relevant art and the present disclosure and will not be interpreted in an idealized or overly formal sense unless expressly so defined herein.

In the related art, the navigation control of an unmanned vehicle and the signal control of an intelligent traffic light are generally considered as two independent agents for decision-making. However, in a complex mixed traffic scenario, the state information of the unmanned vehicle and the intelligent traffic light should be closely related to the decisions of the opposite sides thereof. Considering the unmanned vehicle and the intelligent traffic light as independent agents to make decisions will lead to inaccurate decisions, and thus, the traffic problem in the complex mixed traffic scenario cannot be solved.

In order to solve the related technical problem, the inventor considers referring to the vehicle state representation information of an unmanned vehicle located in a preset range of a traffic light (i.e., a control range of a signal of the traffic light) and the state parameter of the traffic light itself, to determine the traffic light control action of the traffic light, and considers referring to the reinforced traffic light state parameter of the traffic light and the state parameter of the unmanned vehicle itself, to determine a navigation action of the unmanned vehicle. Accordingly, the traffic light and the unmanned vehicle are capable of performing control and navigation in combination with the actual traffic environment, thereby obtaining a more efficient traffic dispersion capability and being suitable for solving the mixed traffic problem in the complex environment. Thus, the efficiency of the traffic system is effectively improved.

Referring to FIG. 1, FIG. 1 illustrates an example traffic environment heterogeneous graph. Here, illustratively, traffic situations in the preset areas (ranges defined by circular dashed lines in the figure) of the traffic lights 1, 2 and 3 at three moments are illustrated in the figure. The actual traffic environment diagram on the left side is converted into the traffic environment heterogeneous graph on the right side according to the idea of a graph neural network (GNN), the graph including a light-light network graph represented by a solid line connection and a vehicle-light network graph represented by a dashed line connection. In the vehicle-light network graph, taking one traffic light as an example, the graph structure of the traffic light may be represented as $$G^t = (V_i^t, E_i^t). \text{ Here, } V_i^t = \{i, V_V^t\}, V_v^t$$

representing a set of all unmanned vehicles contained in a preset area of a traffic light i at a moment t, and $$E_i^t$$

represents an edge connecting the traffic light i and an unmanned vehicle. Similarly, each traffic light in the light-light network graph may also be represented in the same way, but $$V_v^t$$

is used to represent a set of all traffic lights connected to the traffic light i at the moment t. In the methods provided in embodiments of the present disclosure, the state parameter of the unmanned vehicle or the traffic light can be aggregated through a GNN according to the heterogeneous graph, which is described in detail below.

The method and apparatus for controlling a traffic light, the method and apparatus for navigating an unmanned vehicle and the method and apparatus for training a model that are provided in embodiments of the present disclosure are intended to solve at least one of the above technical problems in the prior art.

The method for controlling a traffic light, the method for navigating an unmanned vehicle, and the method for training a model according to embodiments of the present disclosure may be performed by an electronic device such as a terminal device or a server. The terminal device may be a vehicle-mounted device, a user equipment (UE), a mobile device, a user terminal, a terminal, a cellular telephone, a cordless telephone, a personal digital assistant (PDA), a handheld device, a computing device, and a wearable device. The methods may be implemented by a processor by calling a computer readable program instruction stored in a memory. Alternatively, the method for controlling a traffic light, the method for navigating an unmanned vehicle, and the method for training a model provided in embodiments of the present disclosure may be performed by the server.

In a first embodiment of the present disclosure, referring to FIG. 2, FIG. 2 is a flowchart of a method for controlling a traffic light provided in the first embodiment of the present disclosure. The method is applied to a traffic light control end, and the traffic light control end communicates with an unmanned vehicle navigation end. The method includes the following steps:

S101, generating a reinforced traffic light state parameter, according to vehicle state representation information of an unmanned vehicle currently contained in a preset area of a target traffic light and a current traffic light state parameter of the target traffic light.

The preset area of a target traffic light is a traffic control area of the target traffic light, for example, the area defined by circular dashed lines for each traffic light on the left side of FIG. 1, and the specific area range may be set as required.

The vehicle state parameter is used to indicate a traveling state (e.g., a number of unmanned vehicles, a vehicle speed, and/or a traveling direction) of vehicle(s) that is/are currently in a preset range of the target traffic light. The vehicle state representation information is generated by the unmanned vehicle navigation end according to the current vehicle state parameter of the unmanned vehicle(s) contained in the preset area and the historical vehicle state representation information at a plurality of previous moments. More comprehensive traffic environment information can be obtained with reference to the traveling states of the unmanned vehicle at the previous moments.

In combination with the traveling state (i.e., vehicle state representation information) of unmanned vehicle(s) in the preset range of the target traffic light and the traffic light state parameter (e.g., a green light phase) of the traffic light itself, the reinforced traffic light state parameter that is enhanced is obtained. The reinforced traffic light state parameter not only expresses the state of the traffic light itself, but also refers to the traveling state of the vehicle(s) in the traffic control area of the traffic light, and thus has a stronger association with the actual traffic environment.

S102, generating, according to the reinforced traffic light state parameter, a traffic light control action matching the reinforced traffic light state parameter.

Based on the reinforced traffic light state parameter having a stronger association with the actual traffic environment, the traffic light control action matching the reinforced traffic light state parameter is generated, such that the target traffic light performs the traffic light control action. Accordingly, the behavior of the traffic light can be decided in combination with the actual traffic environment, which makes the traffic light obtain a traffic dispersion capability that is more efficient and closely combined with the current traffic environment.

Here, the reinforced traffic light state parameter in S102 is used to cause the unmanned vehicle navigation end to: generate a reinforced vehicle state parameter according to a reinforced traffic light state and the current vehicle state parameter of the target unmanned vehicle, and generate an unmanned vehicle navigation action matching the reinforced vehicle state parameter according to the reinforced vehicle state parameter. The reinforced traffic light state parameter of the traffic light will be transmitted to the unmanned vehicle navigation end, and the congestion situation of the current intersection is very important for the unmanned vehicle to make a navigation decision, and accordingly, the accuracy of the unmanned vehicle navigation end can be improved. Both the unmanned vehicle side and the traffic light side interact with the environment and make decisions with reference to the opposite side. This cooperative control approach is suitable for solving the mixed traffic problem in a complex environment, thereby effectively improving the efficiency of the traffic system.

In some examples, S102 includes: inputting the reinforced traffic light state parameter into a first reinforcement learning model, to obtain the traffic light control action matching the reinforced traffic light state parameter.

In the reinforcement learning technology, the interaction process between the environment and an agent (the traffic light or the unmanned vehicle) is as follows: after obtaining a state $S_t$ from the environment, the agent selects an optimal action $a_t$ according to a policy $\pi$, and performs this action in the environment to generate a new state $S_{t+1}$ and a reward $r_t$. The above is one cycle, and the reinforcement learning process is to repeat this cycle to cause the agent to continuously optimize its own policy, thereby finally learning an optimal policy and the cumulative reward is maximized. Based on this, a reinforcement learning model may be used in S102 to determine the traffic light control action matching the reinforced traffic light state parameter according to the reinforced traffic light state parameter.

Here, models that can be used as the first reinforcement learning model may include a DQN (Deep Q-Network), a SAC (Soft Actor Critic), a PPO (Proximal Policy Optimization), and the like.

It should be noted that a model-free reinforcement learning algorithm may alternatively be used in S102, which is not limited here.

In a second embodiment of the present disclosure, referring to FIG. 3, FIG. 3 illustrates an application framework diagram of the method according to embodiments of the present disclosure. A traffic control end includes a first encoder, a goal network, a first graph neural network and a first reinforcement learning model. An unmanned vehicle navigation end includes an adversarial graph neural network and a second reinforcement learning model. Here, $S_l$ is a traffic light state parameter of a traffic light, $\widetilde{S}_l$ is a reinforced traffic light state parameter, $a_l$ is a traffic light control action corresponding to $\widetilde{S}_l$, and G is a goal vector obtained by the goal network. Here, $S_v$ is an unmanned vehicle state parameter of an unmanned vehicle, $\widetilde{S}_v$ is a reinforced unmanned vehicle state parameter, $a_v$ is an unmanned vehicle navigation action corresponding to $\widetilde{S}_v$, and I is vehicle state representation information of the unmanned vehicle. It should be noted that the method provided in embodiments of the present disclosure can be performed based on a model-free architecture, or may be performed based on a model-based architecture. For ease of description, this embodiment is described based on the framework diagram, but does not constitute a limitation to the present disclosure.

First, a reinforcement learning environment is defined based on the first reinforcement learning model corresponding to a traffic light and the second reinforcement learning model corresponding to an unmanned vehicle, the environment including two agents: the unmanned vehicle, and the traffic light. The two agents can bidirectionally propagate a state parameter, and both interact with the environment and have their own state spaces and action spaces.

For the traffic light:

The state space $S_l$ of the traffic light includes a current phase code which is an one-hot vector representing a current green phase (the green phase being the phase of the green light signal), a pressure (a difference between the total numbers of vehicles waiting on the upstream and downstream roads), a sum of numbers of vehicles in each flow direction (a north-to-south direction, a north-to-west direction, a north-to-east direction, a south-to-north direction, a south-to-west direction, a south-to-east direction, a west-to-north direction, a west-to-south direction, a west-to-east direction, an east-to-north direction, an east-to-west direction, and an east-to-south direction), and an average speed in each flow direction. Here, the traffic light state parameter is the state space at the moment t, and accordingly, the traffic light state parameter includes: the current phase code of the traffic light at the moment t, the pressure at the moment t, the sum of the numbers of vehicles in each flow direction at the moment t, and the average speed in each flow direction at the moment t.

The action space $A_l$ of the traffic light refers to a green phase index when a next moment is a green-light moment ($t=T_G$), each traffic light has green lights in a plurality of flow directions, and the green light in each flow direction has one green phase index. The traffic light control action is an action in an action space of the traffic light that is decided.

The reward function $r_l$ of the traffic light refers to the negative value of the total length of waiting queues on all lanes at an intersection. The following reward parameter is a reward parameter determined according to the reward function under a certain traffic light state parameter.

For the unmanned vehicle:

The state space $S_v$ of the unmanned vehicle includes a vehicle speed, an one-hot vector code of the intersection of a traffic light toward which the unmanned vehicle currently travels, a traveling direction (eastward/westward/southward/northward) code of the traffic light toward which the unmanned vehicle currently travels, an one-hot vector code of an intersection of a destination road, and a code of a direction in which the unmanned vehicle travels into the destination road. Here, the unmanned vehicle state parameter is the state space at the moment t, and the unmanned vehicle state parameter includes: the vehicle speed of the unmanned vehicle at the moment t, the one-hot vector code of the intersection of the traffic light toward which the unmanned vehicle currently travels, the traveling direction code of the traffic light toward which the unmanned vehicle currently travels, the one-hot vector code of the intersection of the destination road, and the code of the direction in which the unmanned vehicle travels into the destination road.

The action space $A_v$ of the unmanned vehicle refers to a steering direction (e.g., leftward, rightward, and straight) at a current intersection. The unmanned vehicle navigation action is an action in an action space of the unmanned vehicle that is decided.

The reward function $r_v$ of the unmanned vehicle: a total time length of the unmanned vehicle traveling on a current road segment. The following reward parameter is a reward parameter determined according to the reward function under a certain unmanned vehicle state parameter.

For the policy $\pi v$ of the unmanned vehicle/the policy $\pi 1$ of the traffic light: a policy function is a function of mapping a state and an action to a policy (i.e., $S \times A \rightarrow \pi$), of which the purpose is to guide an agent to select optimal actions under different states.

For the state transition function $P_v$ of the unmanned vehicle/the state transition function $P_l$ of the traffic light: a state transition function represents a probability of the transition of an agent from a state $S'$ at a current moment to a next state $S_{t+1}$ after taking an action $a_t$.

The discount factor $\gamma_v$ of the unmanned vehicle/the discount factor $\gamma_l$ of the traffic light: represents a discount factor of the reward $r_{t-k}$ in the historical moments (a previous moment k to a current moment t) during calculating the cumulative reward, which makes the contribution of the reward $r_{t-k}$ to the cumulative reward reduced. Here, the calculation equation of the cumulative reward is $$R = \sum_{k=0}^{\infty} \gamma^k r_{t+k+1},$$

and the cumulative reward of the unmanned vehicle or the cumulative reward of the traffic light can be obtained by substituting $\gamma_v$ and $\gamma_l$ into the equation. It should be noted that the rewards used in the following loss functions all refer to the cumulative reward of the unmanned vehicle or the cumulative reward of the traffic light.

In reinforcement learning, the interaction process between the environment and the agent is as follows: after obtaining a state $S_t$ from the environment, the agent selects an optimal action a t according to a policy $\pi$, and performs this action in the environment to generate a new state $S_{t+1}$ and a reward $r_t$. The above is one cycle, and the reinforcement learning process is to repeat this cycle to cause the agent to continuously optimize its own policy, thereby finally learning an optimal policy and the cumulative reward is maximized.

Based on the above definitions, referring to FIG. 4, FIG. 4 is a flowchart of a method for controlling a traffic light provided in the second embodiment of the present disclosure. The method for controlling a traffic light provided in embodiments of the present disclosure is applied to a traffic light control end, the method including the following steps:

S201, stitching vehicle state representation information and a current traffic light state parameter into hybrid environment information.

The vehicle state representation information $$I_i^t$$

is acquired from an unmanned vehicle navigation end, and the current traffic light state $$S_i^t$$

is then acquired. The vehicle state representation information $$I_i^t$$

and the current traffic light state $$S_i^t$$

are stitched into the hybrid environment information through the first plus sign (+) on the left side of FIG. 3.

In some examples, the vehicle representation information is obtained by the unmanned vehicle navigation end through the following steps:

Sub-step 1, generating vehicle state aggregation information according to vehicle state parameter(s) of unmanned vehicle(s) currently contained in a preset area of a target traffic light.

Referring to FIGS. 1 and 3, based on a vehicle-light network graph in the heterogeneous graph on the right side of FIG. 1, the vehicle state parameter $S_j$ of an unmanned vehicle j contained in the preset range of a traffic light i is aggregated using a second graph neural network (GNN) in FIG. 3, thereby generating the current vehicle state aggregation information $X_i$ in the preset range of the traffic light:

$$X_i = \frac{1}{|C(i)|} \sum_{j \in C(i)} W_i S_j \tag{1}$$

Here, C(i) represents an unmanned vehicle in the control area of the traffic light i, and $W_i$ represents a learnable conversion matrix of the traffic light i.

Sub-step 2, generating current vehicle state representation information according to the vehicle state aggregation information and historical vehicle state representation information at a plurality of previous moments.

Since the vehicle-light network graph dynamically changes over time and with the forward progress of the vehicle (e.g., at the moments t1, t2 and t3 in FIG. 1), dynamic vehicle state representation information $$I_i^t$$

may be generated through the vehicle state aggregation information $X_i$ at the current moment t and the vehicle state representation information at a previous moment k:

$$I_i^t = f\left(I_i^{t-k}, I_i^{t-k+1}, I_i^{t-1}, X_i\right) \tag{2}$$

Here, f may be represented by a recurrent neural network (RNN) or a linear function, and is modeled using the linear function in FIG. 3.

In this way, by aggregating the unmanned vehicle state parameters of the unmanned vehicles contained in the preset range of the traffic light at the current and previous moments, more comprehensive traffic environment information can be obtained.

S202, inputting the hybrid environment information into a first encoder to obtain a reinforced traffic light state parameter.

Here, the first encoder is a fully connected multilayer perceptron (MLP) having three layers.

The hybrid environment information is transmitted to the fully connected MLP to generate the reinforced traffic light state parameter that is enhanced:

$$\hat{S}_{t_i} = MLP\left(S_i^t \oplus I_i^t\right) \tag{3}$$

Here, the reinforced traffic light state parameter includes the congestion situation of a current intersection and the intention information of an unmanned vehicle in the traffic control range of the traffic light, thereby achieving the interaction between the traffic light and the environment. Moreover, the information is very valuable for the navigation decision of the unmanned vehicle at the intersection.

Therefore, in some examples, the traffic light control end sends the reinforced traffic light state parameter to the unmanned vehicle navigation end. Referring to the sign + on the right side of FIG. 3, the unmanned vehicle navigation end generates the reinforced vehicle state parameter $\hat{S}_{t_j}$ according to the reinforced traffic light state and the current vehicle state parameter of a target unmanned vehicle, that is, $$\hat{S}_{t_j} = S_j^t \oplus \hat{S}_{t_i}. \text{ Here, } j \in C(i)^t,$$

which represents the unmanned vehicle j contained in the preset range of the traffic light i at the moment t. Subsequently, the reinforced vehicle state parameter $\hat{S}_{t_j}$ is inputted into the second reinforcement learning model to obtain an unmanned vehicle navigation action $$a_j^t$$

matching the reinforced vehicle state parameter $\hat{S}_{t_j}$. By making a decision on the unmanned vehicle navigation action with reference to the state parameter of the traffic light side, the accuracy of the unmanned vehicle navigation end can be improved. Both the unmanned vehicle side and the traffic light side interact with the environment and make decisions with reference to the opposite side. This approach of collaborating with the control end is suitable for solving the mixed traffic problem in a complex environment, thereby effectively improving the efficiency of the traffic system.

The second reinforcement learning model may include a DQN (Deep Q-Network), a SAC (Soft Actor Critic), a PPO (Proximal Policy Optimization), and the like.

It should be noted that S201 and S202 are one implementation of S101 and S101 has other implementations, which is not limited here.

S203, acquiring associated traffic light state aggregation information of associated traffic lights associated with a target traffic light.

In some examples, the traffic light makes a decision not only with reference to the state parameter of the unmanned vehicle in the preset range of the traffic light, but also with reference to the state parameter of traffic light(s) associated with the traffic light. Specifically, through the light-light network graph in the heterogeneous graph on the right side of FIG. 1, the state parameters of traffic lights around the traffic light are aggregated based on the first graph neural network. In this situation, the associated traffic light state aggregation information in S203 is generated through the following steps:

Step 1, generating an associated traffic light state matrix according to a current traffic light state parameter of the associated traffic lights.

The current traffic light state parameters of associated traffic lights associated with the target traffic light is acquired, and expressed as an associated traffic light state matrix X in a matrix form.

Step 2, generating the associated traffic light state aggregation information, according to the associated traffic light state matrix, a connectivity parameter of the target traffic light, and a weight matrix of the target traffic light.

Here, further referring to FIG. 3, the above step 2 specifically includes: generating, through the first graph neural network, the associated traffic light state aggregation information according to the associated traffic light state matrix, the connectivity parameter of the target traffic light, and the weight matrix of the target traffic light.

As shown by the traffic lights connected by solid lines in FIG. 3, if two traffic lights are adjacent, there is a connecting edge therebetween. The traffic light states of the associated traffic lights are aggregated using the first graph neural network and in combination with a residual connection, to generate the associated traffic light state aggregation information H:

$$H = \sigma\left(D^{-\frac{1}{2}}\tilde{A}D^{-\frac{1}{2}}XW\right) + X \qquad (4)$$

Here, X is the associated traffic light state matrix, $\tilde{A}=A+I$ is an adjacency matrix participating in a self-loop, D represents the connectivity parameter of the target traffic light, the connectivity parameter of each traffic light i is represented as the number of associated traffic lights to which the traffic light connects, and W represents a weight matrix of the first graph neural network that can be learned. In this way, in an actual traffic environment, the vehicle flows at adjacent intersections are interrelated, and accordingly, the traffic light can learn the comprehensive environment information around the intersection to the maximum extent with reference to the states of the traffic lights at adjacent intersections.

It should be noted that, in the embodiment based on S203, the loss function L of the first reinforcement learning model is represented as:

$$L = E\left[r_t + \gamma\max_a \tilde{Q}_l\left(\hat{S}_l^{t+1}, A, a|\theta_l, \overline{W}\right) - Q_l\left(\hat{S}_l^t, A, a_t^l|\theta_l, W\right)\right] \qquad (5)$$

Here, $r_t$ is a cumulative reward of the traffic light, $\gamma$ is a preset weight coefficient, $\theta$ is a parameter of a $Q_l$ value function, W is a weight matrix of the above first graph neural network, $S_1$ is the $\hat{S}_{r_i}$ in Equation (3), the part before the minus sign is an ideal Q-value predicted by the first reinforcement learning model, the part behind the minus sign is an actual Q-value, and the optimization goal of the first reinforcement learning model is to reduce the difference between the two parts.

S204, generating a traffic light control action matching the reinforced traffic light state parameter, according to the reinforced traffic light state parameter and the associated traffic light state aggregation information.

In some examples, further referring to FIG. 3, S204 specifically includes:

inputting the reinforced traffic light state parameter and the associated traffic light state aggregation information into the first reinforcement learning model, to obtain the traffic light control action matching the reinforced traffic light state parameter.

The associated traffic light state aggregation information H and the reinforced traffic light state parameter $\hat{S}_{r_i}$ are transmitted to the first reinforcement learning model of the traffic light to determine the corresponding traffic light control action. In this way, the decision can be made on the behavior of the traffic light in combination with the actual traffic environment (containing the state parameters of a vehicle and of the traffic light around the vehicle), which makes the traffic light obtain a traffic dispersion capability that is more efficient and closely combined with the current traffic environment. Moreover, both the unmanned vehicle side and the traffic light side interact with the environment and make decisions with reference to the opposite side. This approach of collaborating with the control end is suitable for solving the mixed traffic problem in a complex environment, thereby effectively improving the efficiency of the traffic system.

Here, the first reinforcement learning model may include a DQN (Deep Q-Network), a SAC (Soft Actor Critic), a PPO (Proximal Policy Optimization), and the like.

It should be noted that S203 and S204 are an implementation of S102 and S101 has other implementations, which is not limited here.

In some examples, further referring to FIG. 3, at any step after S202 (or S101), the method for controlling a traffic light provided by embodiments of the present disclosure further includes:

inputting the reinforced traffic light state parameter into a pre-trained goal network to obtain a goal vector.

Here, the unmanned navigation end generates, through the second reinforcement learning model, the unmanned vehicle navigation action matching the reinforced vehicle state parameter according to the reinforced vehicle state parameter, and the goal vector is used to cause the unmanned vehicle navigation end to adjust the second reinforcement learning model according to the goal vector.

The optimization goal of the first reinforcement model for the traffic light is to perform a traffic dispersion, the optimization goal of the second reinforcement model for the unmanned vehicle is to more efficiently perform a navigation, and the optimization goals of the two are inconsistent. Therefore, in order to solve the problem that the goals of the two agents are inconsistent, a goal vector is introduced to facilitate the traffic light, which is an approximate manager, in guiding the unmanned vehicle, which is an approximate performer, to perform an optimization toward a uniform goal. The goal network is an MLP composed of three layers of fully-connected neural networks, and the goal vector is $$G_i^t = MLP(\hat{S}_{t_i}),\ G_i^t$$

representing an ideal next vehicle state parameter of the unmanned vehicle. The goal network sends the outputted goal vector to the unmanned vehicle navigation end to unify the optimization goals of the first and second reinforcement learning models, such that the collaboration therebetween is enhanced.

In a third embodiment of the present disclosure, referring to FIG. 5, FIG. 5 is a flowchart of a method for navigating an unmanned vehicle provided in the third embodiment of the present disclosure. The method is applied to an unmanned vehicle navigation end, and the unmanned vehicle navigation end communicates with a traffic light control end. The method includes the following steps:

S301, generating a reinforced vehicle state parameter, according to a current reinforced traffic light state parameter of a target traffic light that is acquired from a traffic light control end and a current vehicle state parameter of a target unmanned vehicle.

Here, the traffic light control end generates a reinforced traffic light state parameter according to the following approach. The traffic light control end generates the reinforced traffic light state parameter, according to the vehicle state representation information of an unmanned vehicle currently contained in a preset area of the target traffic light and the current traffic light state parameter of the target traffic light.

The preset area of a target traffic light is a traffic control area of the target traffic light, for example, the area defined by circular dashed lines for each traffic light on the left side of FIG. 1, and the specific area range may be set as required.

The vehicle state parameter is used to indicate a traveling state (e.g., a number of unmanned vehicles, a vehicle speed, and/or a traveling direction) of vehicle(s) that is/are currently in a preset range of the target traffic light. The vehicle state representation information is generated by the unmanned vehicle navigation end according to the current vehicle state parameter of the unmanned vehicle(s) contained in the preset area and the historical vehicle state representation information at a plurality of previous moments. More comprehensive traffic environment information can be obtained with reference to the traveling states of the unmanned vehicle at the previous moments. In combination with the traveling state (i.e., vehicle state representation information) of unmanned vehicle(s) in the preset range of the target traffic light and the traffic light state parameter (e.g., a green light phase) of the traffic light itself, the reinforced traffic light state parameter that is enhanced is obtained. The reinforced traffic light state parameter not only expresses the state of the traffic light itself, but also refers to the traveling state of the vehicle(s) in the traffic control area of the traffic light, and thus has a stronger association with the actual traffic environment.

Then, the reinforced vehicle state parameter is generated based on the reinforced traffic light state parameter and the vehicle state parameter of the unmanned vehicle. The reinforced vehicle state parameter not only expresses the state of the unmanned vehicle itself, but also refers to the reinforced traffic light state of the traffic light to which the unmanned vehicle belongs, and thus has a stronger association with the actual traffic environment.

S302, generating an unmanned vehicle navigation action matching the reinforced vehicle state parameter according to the reinforced vehicle state parameter.

Based on the reinforced vehicle state parameter which has a stronger association with the actual traffic environment, the unmanned vehicle navigation action matching the reinforced unmanned vehicle state parameter is generated, such that the target unmanned vehicle performs the unmanned vehicle navigation action. Accordingly, the decision can be made on the behavior of the unmanned vehicle in combination with the actual traffic environment, which makes the unmanned vehicle obtain a navigation capability that is more accurate and closely combined with the current traffic environment.

Moreover, the unmanned vehicle side transmits the vehicle state representation information of the unmanned vehicle to the traffic light side, and both the unmanned vehicle side and the traffic light side interact with the environment and make decisions with reference to the opposite side. This approach of collaborating with the control end is suitable for solving the mixed traffic problem in a complex environment, thereby effectively improving the efficiency of the traffic system.

Specifically, a reinforcement learning model or a model-free reinforcement learning algorithm may be used in S302, which is not limited here.

In a fourth embodiment of the present disclosure, it should be noted that the method provided in embodiments of the present disclosure can be performed based on a model-free architecture, or may be performed based on a model-based architecture. For ease of description, this embodiment is described based on the framework diagram shown in FIG. 3, but does not constitute a limitation to the present disclosure. Referring to FIG. 6, FIG. 6 is a flowchart of a method for navigating an unmanned vehicle provided in the fourth embodiment of the present disclosure. The method includes the following steps:

S401, generating vehicle state aggregation information according to a vehicle state parameter of an unmanned vehicle currently contained in a preset area of a target traffic light.

Further referring to FIG. 3, S401 specifically includes: generating, through a second graph neural network, the vehicle state aggregation information according to the vehicle state parameter of the unmanned vehicle currently contained in the preset area of the target traffic light.

Referring to FIGS. 1 and 3, based on a vehicle-light network graph in the heterogeneous graph on the right side of FIG. 1, the vehicle state parameter $S_j$ of an unmanned vehicle j contained in the preset range of a traffic light i is aggregated using a second graph neural network (GNN) in FIG. 3, thereby generating the current vehicle state aggregation information X i in the preset range of the traffic light:

$$X_i = \frac{1}{|C(i)|} \sum\nolimits_{j \in C(i)} W_i S_j \tag{1}$$

Here, C(i) represents an unmanned vehicle in the control area of the traffic light i, and $W_i$ represents a learnable conversion matrix of the traffic light i.

S402, generating current vehicle state representation information according to the vehicle state aggregation information and historical vehicle state representation information at a plurality of previous moments.

Since the vehicle-light network graph dynamically changes over time and with the forward progress of the vehicle (e.g., at the moments t1, t2 and t3 in FIG. 1), dynamic vehicle state representation information $$I_i^t$$

may be generated through the vehicle state aggregation information $X_i$ at the current moment t and the vehicle state representation information at a previous moment k:

$$I_i^t = f(I_i^{t-k}, I_i^{t-k+1}, I_i^{t-1}, X_i) \tag{2}$$

In some implementations, a plurality of approaches may be used. The f in Equation (2) may be represented in many ways. In other words, the generation of the current vehicle state representation information through the vehicle state aggregation information and the historical vehicle state representation information at the plurality of previous moments may be implemented through the plurality of approaches, for example:

Approach 1, inputting the vehicle state aggregation information and the historical vehicle state representation information at a plurality of previous moments into a recurrent neural network (RNN), to obtain the current vehicle state representation information.

Approach 2, constructing a linear function according to the historical vehicle state representation information at a plurality of previous moments, and obtaining, through the linear function, the current vehicle state representation information according to the vehicle state aggregation information.

After S402, the vehicle state representation information is sent to the traffic light control end. The traffic light control end generates a reinforced traffic light state parameter according to the vehicle state representation information of the unmanned vehicle currently contained in the preset area of the target traffic light and the current traffic light state parameter of the target traffic light, and sends the reinforced traffic light state parameter to the unmanned vehicle navigation end.

The traffic light control end determines the reinforced traffic light state parameter through the following steps:

Step 1, stitching the vehicle state representation information and the current traffic light state parameter into hybrid environment information.

The vehicle state representation information $$I_i^t$$

is acquired from the unmanned vehicle navigation end, and the current traffic light state $$S_i^t$$

is then acquired. The vehicle state representation information $$I_i^t$$

and the current traffic light state $$S_i^t$$

are stitched into the hybrid environment information through the first plus sign (+) on the left side of FIG. 3.

Step 2, inputting the hybrid environment information into a first encoder to obtain the reinforced traffic light state parameter.

Here, the first encoder is a fully connected multilayer perceptron (MLP) having three layers.

The hybrid environment information is transmitted to the fully connected MLP to generate the reinforced traffic light state parameter that is enhanced:

$$\hat{S}_{t_i} = MLP\left(S_i^t \oplus I_i^t\right) \tag{3}$$

Here, the reinforced traffic light state parameter includes the congestion situation of a current intersection and the intention information of the unmanned vehicle in the traffic control range of the traffic light, thereby achieving the interaction between the traffic light and the environment. Moreover, the information is very valuable for the navigation decision of the unmanned vehicle at the intersection.

S403, generating a reinforced vehicle state parameter according to a current reinforced traffic light state parameter of a target traffic light that is acquired from a traffic light control end and a current vehicle state parameter of a target unmanned vehicle.

Based on Equation (3), the traffic light control end sends the reinforced traffic light state parameter to the unmanned vehicle navigation end. Referring to the sign + on the right side of FIG. 3, the unmanned vehicle navigation end generates the reinforced vehicle state parameter $\hat{S}_{t_i}$ according to the reinforced traffic light state and the current vehicle state parameter of the target unmanned vehicle, that is, $$\hat{S}_{t_j} = S_j^t \oplus \hat{S}_{t_i}. \text{ Here, } j\epsilon C(i)^t,$$

which represents the unmanned vehicle j contained in the preset range of the traffic light i at the moment t.

S404, inputting the reinforced vehicle state parameter into a second reinforcement learning model, to obtain an unmanned vehicle navigation action matching the reinforced vehicle state parameter.

The reinforced vehicle state parameter $\hat{S}_{t_j}$ is inputted into the second reinforcement learning model to obtain the unmanned vehicle navigation action $$a_j^t$$

matching the reinforced vehicle state parameter $\hat{S}_{t_j}$. By making a decision on the unmanned vehicle navigation action with reference to the state parameter of the traffic light side, the accuracy of the unmanned vehicle navigation end can be improved. Both the unmanned vehicle side and the traffic light side interact with the environment and make decisions with reference to the opposite side. This approach of collaborating with the control end is suitable for solving the mixed traffic problem in a complex environment, thereby effectively improving the efficiency of the traffic system.

In some implementations, the method for navigating an unmanned vehicle provided in embodiments of the present disclosure further includes:

adjusting the second reinforcement learning model according to a goal vector.

Here, the goal vector is generated by the traffic light control end through the following approach:

inputting the reinforced traffic light state parameter into a pre-trained goal network to obtain the goal vector.

The optimization goal of the first reinforcement model for the traffic light is to perform a traffic dispersion, the optimization goal of the second reinforcement model for the unmanned vehicle is to more efficiently perform a navigation, and the optimization goals of the two are inconsistent. Therefore, in order to solve the problem that the goals of the two agents are inconsistent, the goal vector is introduced to facilitate the traffic light, which is an approximate manager, in guiding the unmanned vehicle, which is an approximate performer, to perform an optimization toward a uniform goal. The goal network is an MLP composed of three layers of fully-connected neural networks, and the goal vector is $$G_i^t = MLP(\hat{S}_{t_i}), G_i^t$$

representing an ideal next vehicle state parameter of the unmanned vehicle. The goal network sends the outputted goal vector to the unmanned vehicle navigation end to unify the optimization goals of the first and second reinforcement learning models, such that the collaboration therebetween is enhanced.

Figure 7:
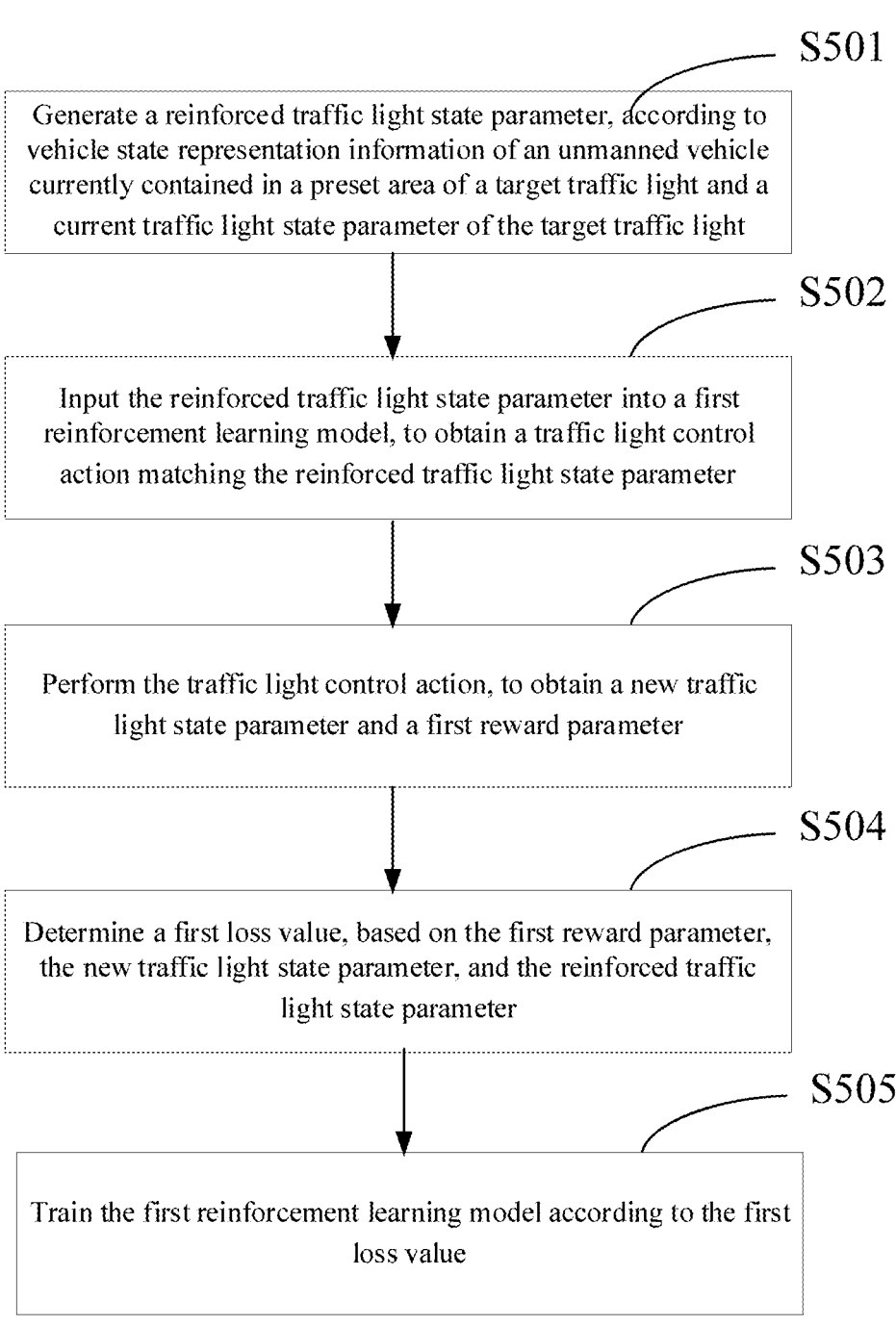
FIG. 7 is a schematic flowchart of a method for training a model provided in a fifth embodiment of the present disclosure.

In a fifth embodiment of the present disclosure, referring to FIG. 7, FIG. 7 is a flowchart of a method for training a model provided in the fifth embodiment of the present disclosure. The method includes the following steps:

S501, generating a reinforced traffic light state parameter, according to vehicle state representation information of an unmanned vehicle currently contained in a preset area of a target traffic light and a current traffic light state parameter of the target traffic light.

The preset area of a target traffic light is a traffic control area of the target traffic light, for example, the area defined by circular dashed lines for each traffic light on the left side of FIG. 1, and the specific area range may be set as required.

The vehicle state parameter is used to indicate a traveling state (e.g., a number of unmanned vehicles, a vehicle speed, and/or a traveling direction) of vehicle(s) that is/are currently in a preset range of the target traffic light. The vehicle state representation information is generated by an unmanned vehicle navigation end according to the current vehicle state parameter of the unmanned vehicle(s) contained in the preset area and the historical vehicle state representation information at a plurality of previous moments. More comprehensive traffic environment information can be obtained with reference to the traveling states of the unmanned vehicle at the previous moments.

In combination with the traveling state (i.e., vehicle state representation information) of unmanned vehicle(s) in the preset range of the target traffic light and the traffic light state parameter (e.g., a green light phase) of the traffic light itself, the reinforced traffic light state parameter that is enhanced is obtained. The reinforced traffic light state parameter not only expresses the state of the traffic light itself, but also refers to the traveling state of the vehicle(s) in the traffic control area of the traffic light, and thus has a stronger association with the actual traffic environment.

S502, inputting the reinforced traffic light state parameter into a first reinforcement learning model, to obtain a traffic light control action matching the reinforced traffic light state parameter.

In some examples, S502 includes the following steps:

S502A, acquiring associated traffic light state aggregation information of associated traffic light(s) associated with the target traffic light.

In some examples, the traffic light makes a decision not only with reference to the state parameter of the unmanned vehicle in the preset range of the traffic light, but also with reference to the state parameter of a traffic light associated with the traffic light. Specifically, through the light-light network graph in the heterogeneous graph on the right side of FIG. 1, the state parameters of traffic lights around traffic light are aggregated based on a first graph neural network.

Here, the associated traffic light state aggregation information in S502A is generated through the following steps:

Step 1, generating an associated traffic light state matrix according to a current traffic light state parameter of the associated traffic lights.

The current traffic light state parameters of associated traffic lights associated with the target traffic light is acquired, and expressed as an associated traffic light state matrix X in a matrix form.

Step 2, generating the associated traffic light state aggregation information according to the associated traffic light state matrix, a connectivity parameter of the target traffic light and a weight matrix of the target traffic light.

Here, further referring to FIG. 3, the above step 2 specifically includes: generating, through the first graph neural network, the associated traffic light state aggregation information according to the associated traffic light state matrix, the connectivity parameter of the target traffic light, and the weight matrix of the target traffic light.

As shown by the traffic lights connected by solid lines in FIG. 3, if two traffic lights are adjacent, there is a connecting edge therebetween. The traffic light states of the associated traffic lights are aggregated using the first graph neural network and in combination with a residual connection, to generate the associated traffic light state aggregation information H:

$$H = \sigma\left(D^{-\frac{1}{2}}\tilde{A}D^{-\frac{1}{2}}XW\right) + X \tag{4}$$

Here, X is the associated traffic light state matrix, $\tilde{A}=A+I$ is an adjacency matrix participating in a self-loop, D represents the connectivity parameter of the target traffic light, the connectivity parameter of each traffic light i is represented as the number of associated traffic lights to which the traffic light connects, and W represents a weight matrix of the first graph neural network that can be learned. In this way, in an actual traffic environment, the vehicle flows at adjacent intersections are interrelated, and accordingly, the traffic light can learn the comprehensive environment information around the intersection to the maximum extent with reference to the states of the traffic lights at adjacent intersections.

S502B, inputting the reinforced traffic light state parameter and the associated traffic light state aggregation information into the first reinforcement learning model, to obtain the traffic light control action matching the reinforced traffic light state parameter.

The associated traffic light state aggregation information H and the reinforced traffic light state parameter $\hat{S}_{t_i}$ are transmitted to the first reinforcement learning model of the traffic light to determine the corresponding traffic light control action.

S503, performing the traffic light control action, to obtain a new traffic light state parameter and a first reward parameter.

The target traffic light is caused to perform the traffic light control action, to obtain a new traffic light state parameter and a first reward parameter through the first reinforcement learning model.

S504, determining a first loss value, based on the first reward parameter, the new traffic light state parameter, and the reinforced traffic light state parameter.

In the embodiment based on S502A-S502B, S504 includes:

determining the first loss value, based on the first reward parameter $r_t$, the new traffic light state parameter $$\tilde{S}_i^{t+1},$$

a weight matrix $\tilde{W}$ corresponding to the new traffic light state parameter, the reinforced traffic light state parameter $$\tilde{S}_i^t$$

and a weight matrix W corresponding to the reinforced traffic light state parameter.

Here, the weight matrices are learned and obtained during the training of the first reinforcement learning model.

The loss function L of the first reinforcement learning model is represented as:

$$L = E\left[r_t + \gamma \max_a \tilde{Q}_1\left(\hat{S}_1^{t+1}, A, a|\theta_1, \tilde{W}\right) - Q_1\left(\hat{S}_1^{t}, A, a_1'|\theta_1, W\right)\right] \quad (5)$$

Here, $r_t$ is a cumulative reward (i.e., the first reward parameter) of the traffic light, $\gamma$ is a preset weight coefficient, $\theta$ is a parameter of a $Q_t$-value function, W is a weight matrix of the above first graph neural network, and $S_t$ is the $\hat{S}_{t_j}$ in Equation (3). The first loss value is obtained through Equation (5).

S505, training the first reinforcement learning model according to the first loss value.

The first loss value is back-propagated to the first reinforcement learning model for optimization. Referring to Equation (5), the part before the minus sign is an ideal Q-value predicted by the first reinforcement learning model, the part behind the minus sign is an actual Q-value, and the optimization goal of the first reinforcement learning model is to reduce the difference between the two parts.

In a sixth embodiment of the present disclosure, referring to FIG. 8, FIG. 8 is a flowchart of a method for training a model provided in the sixth embodiment of the present disclosure. The method includes the following steps:

S601, generating a reinforced vehicle state parameter, according to a current reinforced traffic light state parameter of a target traffic light that is acquired from a traffic light control end and a current vehicle state parameter of a target unmanned vehicle.

Here, the traffic light control end generates a reinforced traffic light state parameter according to the following approach. The traffic light control end generates the reinforced traffic light state parameter according to the vehicle state representation information of an unmanned vehicle currently contained in a preset area of the target traffic light and the current traffic light state parameter of the target traffic light.

The preset area of one target traffic light is a traffic control area of the target traffic light, for example, the area defined by circular dashed lines for each traffic light on the left side of FIG. 1, and the specific area range may be set as required.

The vehicle state parameter is used to indicate a traveling state (e.g., a number of unmanned vehicles, a vehicle speed, and/or a traveling direction) of vehicle(s) that is/are currently in a preset range of the target traffic light. The vehicle state representation information is generated by the unmanned vehicle navigation end according to the current vehicle state parameter of the unmanned vehicle(s) contained in the preset area and the historical vehicle state representation information at a plurality of previous moments. More comprehensive traffic environment information can be obtained with reference to the traveling states of the unmanned vehicle at the previous moments. Then, the reinforced vehicle state parameter is generated based on the reinforced traffic light state parameter and the vehicle state parameter of the unmanned vehicle. The reinforced vehicle state parameter not only expresses the state of the unmanned vehicle itself, but also refers to the reinforced traffic light state of the traffic light to which the unmanned vehicle belongs, and thus has a stronger association with the actual traffic environment.

S602, inputting the reinforced vehicle state parameter into a second reinforcement learning model, to obtain an unmanned vehicle navigation action matching the reinforced vehicle state parameter.

S603, performing the unmanned vehicle navigation action to obtain a new vehicle state parameter and a second reward parameter.

The target unmanned vehicle is caused to perform the unmanned vehicle navigation action, to obtain a new vehicle state parameter and a second reward parameter through the second reinforcement learning model.

S604, determining a second loss value based on the second reward parameter $r_t$, the new vehicle state parameter $S_{t+1}$, and the reinforced vehicle state parameter $S_t$.

The second reinforcement learning model introduces two neural networks (i.e., a current Q network and a goal $\tilde{Q}$ network). Each step of the current Q network is iteratively trained with the interaction between an agent and the environment, and the goal $\tilde{Q}$ network synchronizes parameters with the current Q network at intervals of a time step T.

A temporal difference learning approach is used when the parameter $\theta$ of the current Q network is updated, and the loss function of the second reinforcement learning model is represented as:

$$L_\theta = E\left[r_t + \gamma \max_a \tilde{Q}(S_{t+1}, a|\tilde{\theta}) - Q(S_t, a_t|\theta)\right]^2 \quad (6)$$

Here, $r_t$ is a cumulative reward (i.e., the second reward parameter) of the unmanned vehicle, $\gamma$ is a preset weight coefficient, $\theta$ is a parameter of a $Q_t$-value function, and $S_t$ is the above $\hat{S}_{t_j}$. The second loss value is obtained through Equation (6).

S605, training the second reinforcement learning model according to the second loss value.

The second loss value is back-propagated to the second reinforcement learning model for optimization. Referring to Equation (6), the part before the minus sign is an ideal Q-value predicted by the second reinforcement learning model, the part behind the minus sign is an actual Q-value, and the optimization goal of the second reinforcement learning model is to reduce the difference between the two parts.

In some implementations, after S603 and before S604, the method further includes:

Step 1, determining an additional reward parameter, according to a goal vector, the current vehicle state parameter, and an ideal vehicle state parameter predicted according to the second reinforcement learning model.

Here, the goal vector is generated by the traffic light control end through the method according to claim 8.

Step 2, updating the second reward parameter according to the additional reward parameter.

Based on this, the second reward parameter in S604 is the updated second reward parameter.

The optimization goal of the first reinforcement model for the traffic light is to perform a traffic dispersion, the optimization goal of the second reinforcement model for the unmanned vehicle is to more efficiently perform a navigation, and the optimization goals of the two are inconsistent. Therefore, in order to solve the problem that the goals of the two agents are inconsistent, a goal vector is introduced to facilitate the traffic light, which is an approximate manager, in guiding the unmanned vehicle, which is an approximate performer, to perform an optimization toward a uniform goal. A goal network is an MLP composed of three layers of fully-connected neural networks, and the goal vector is $$G_i^t = MLP(\hat{S}_{t_i}), G_i^t$$

representing an ideal next vehicle state parameter of the unmanned vehicle.

After the second reward parameter is obtained in S604, based on the goal $$vector G_i^{t-1},$$

the current vehicle state parameter $$S_j^t,$$

and the ideal vehicle state parameter $$S_j^{t-1}$$

predicted according to the second reinforcement learning model, an internal additional reward parameter is calculated through a cosine distance:

$$r_{int}^t = d_{cos}(S_j^t, S_j^{t-1} + G_j^{t-1}) \qquad (7)$$

The additional reward parameter is used to measure the difference between the vehicle state parameter $$S_j^t$$

and an ideal current vehicle state parameter $$S_j^{t-1} + G_i^{t-1}.$$

Based on this, when the second loss value of the unmanned vehicle is calculated, the second reward parameter $r_t$ in Equation (6) is the sum of the additional reward parameter $$r_{int}^t$$

and an external reward $$r_{ext}^t$$

obtained from the environment, and accordingly, the final second reward parameter $$r_t(\text{i.e., } r_j^t)$$

of the unmanned vehicle is obtained, that is, $$r_j^t = \alpha r_j^{t,int} + r_j^{t,ext},$$

$\alpha$ being a preset additional reward parameter weight.

Figure 9:
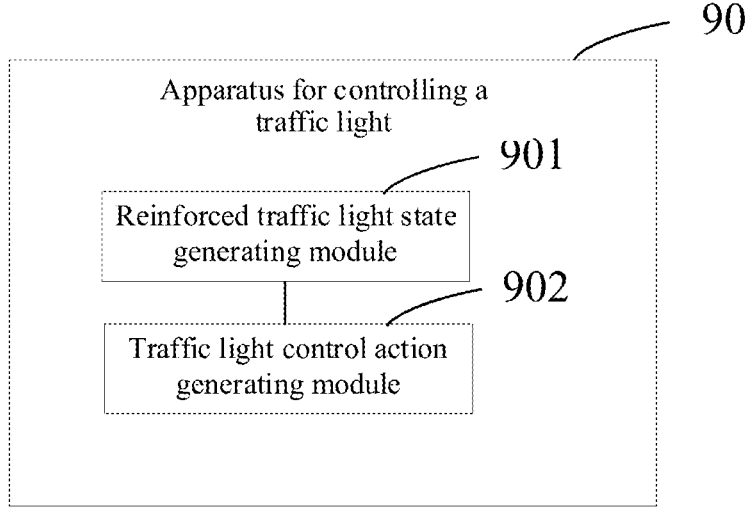
FIG. 9 is a schematic structural diagram of an apparatus for controlling a traffic light provided in a seventh embodiment of the present disclosure.

In a seventh embodiment of the present disclosure, based on the same principle as that in FIG. 2, FIG. 9 illustrates an apparatus 90 for controlling a traffic light provided in the seventh embodiment of the present disclosure. The apparatus includes:

a reinforced traffic light state generating module 901, configured to generate a reinforced traffic light state parameter according to vehicle state representation information of an unmanned vehicle currently contained in a preset area of a target traffic light and a current traffic light state parameter of the target traffic light; and a traffic light control action generating module 902, configured to generate a traffic light control action matching the reinforced traffic light state parameter according to the reinforced traffic light state parameter.

Here, the reinforced traffic light state parameter is used to cause an unmanned vehicle navigation end to generate a reinforced vehicle state parameter according to a reinforced traffic light state and a current vehicle state parameter of a target unmanned vehicle, and generate an unmanned vehicle navigation action matching the reinforced vehicle state parameter according to the reinforced vehicle state parameter.

Figure 10:
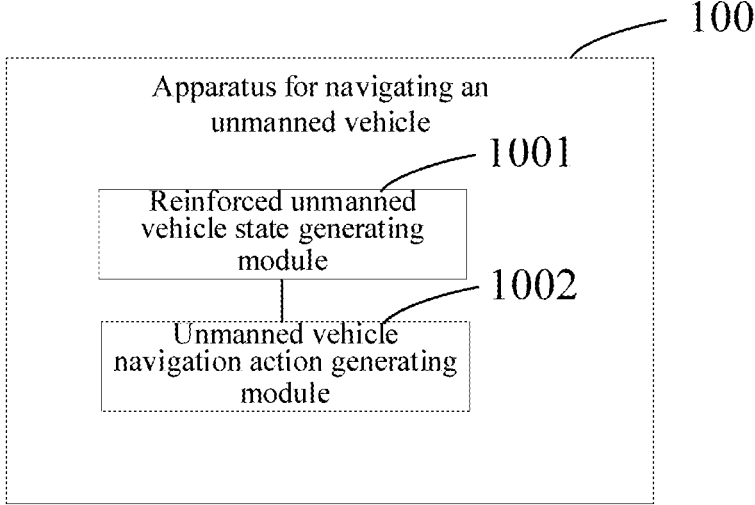
FIG. 10 is a schematic structural diagram of an apparatus for navigating an unmanned vehicle provided in an eighth embodiment of the present disclosure.

In an eighth embodiment of the present disclosure, based on the same principle as that in FIG. 5, FIG. 10 illustrates an apparatus 100 for navigating an unmanned vehicle provided in the eighth embodiment of the present disclosure. The apparatus includes:

a reinforced unmanned vehicle state generating module 1001, configured to generate a reinforced vehicle state parameter according to a current reinforced traffic light state parameter of a target traffic light that is acquired from a traffic light control end and a current vehicle state parameter of a target unmanned vehicle; and an unmanned vehicle navigation action generating module 1002, configured to generate an unmanned vehicle navigation action matching the reinforced vehicle state parameter according to the reinforced vehicle state parameter.

Here, the traffic light control end generates the reinforced traffic light state parameter according to the above method for controlling a traffic light.

Figure 11:
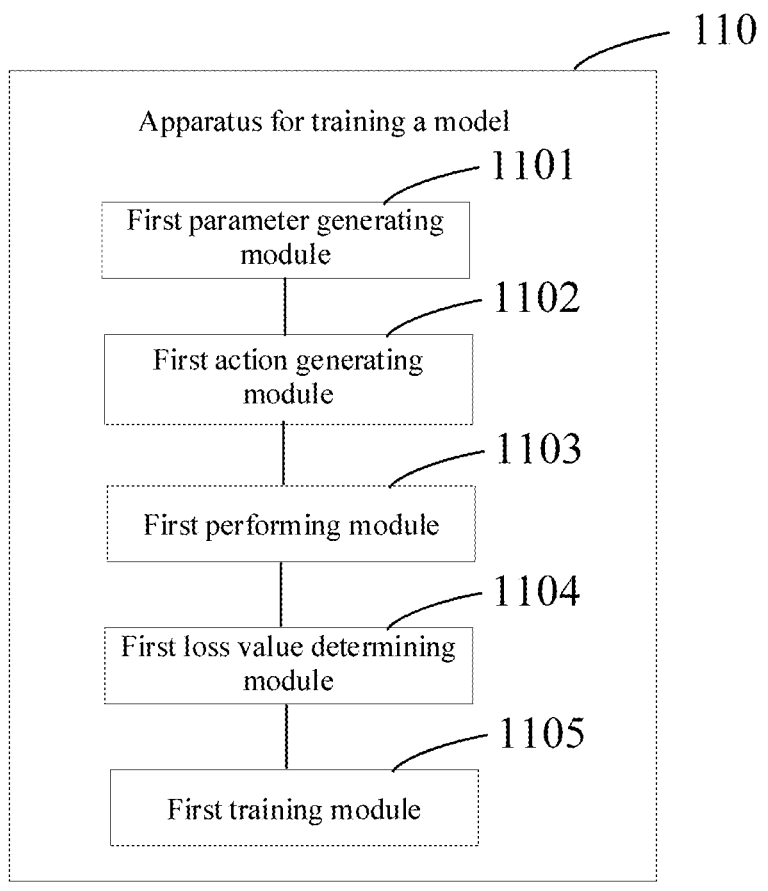
FIG. 11 is a schematic structural diagram of an apparatus for training a model provided in a ninth embodiment of the present disclosure.

In a ninth embodiment of the present disclosure, based on the same principle as that in FIG. 7, FIG. 11 illustrates an apparatus 110 for training a model provided in the ninth embodiment of the present disclosure. The apparatus includes:

a first parameter generating module 1101, configured to generate a reinforced traffic light state parameter according to vehicle state representation information of an unmanned vehicle currently contained in a preset area of a target traffic light and a current traffic light state parameter of the target traffic light;

a first action generating module 1102, configured to input the reinforced traffic light state parameter into a first reinforcement learning model to obtain a traffic light control action matching the reinforced traffic light state parameter;

a first performing module 1103, configured to perform the traffic light control action to obtain a new traffic light state parameter and a first reward parameter;

a first loss value determining module 1104, configured to determine a first loss value based on the first reward parameter, the new traffic light state parameter, and the reinforced traffic light state parameter; and a first training module 1105, configured to train the first reinforcement learning model according to the first loss value.

Figure 12:
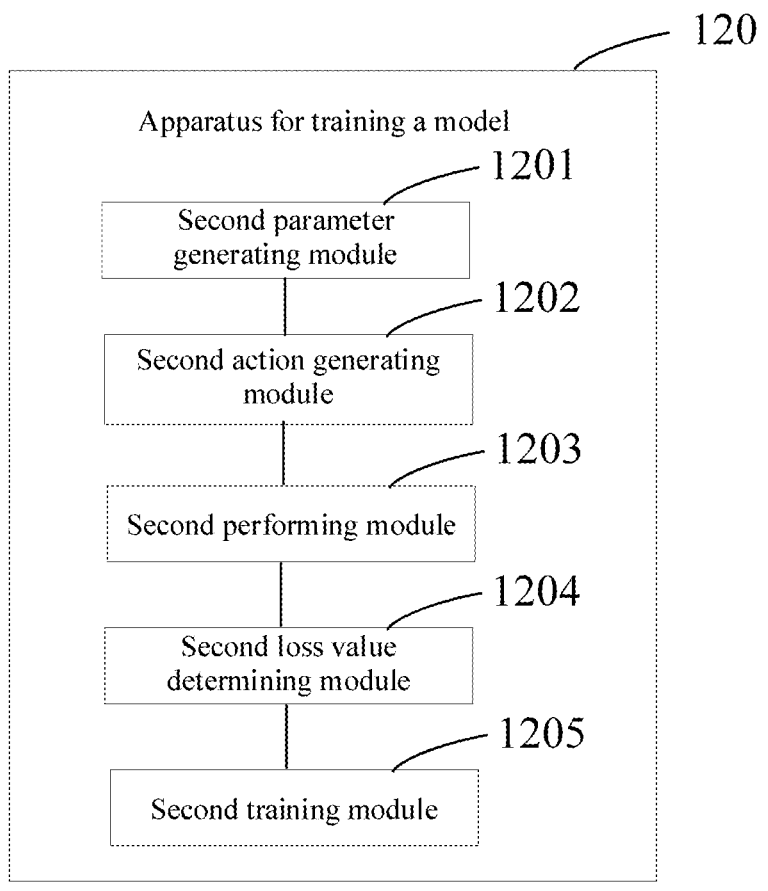
FIG. 12 is a schematic structural diagram of an apparatus for training a model provided in a tenth embodiment of the present disclosure.

In a tenth embodiment of the present disclosure, based on the same principle as that in FIG. 8, FIG. 12 illustrates an apparatus 120 for training a model provided in the tenth embodiment of the present disclosure. The apparatus includes:

a second parameter generating module 1201, configured to generate a reinforced vehicle state parameter according to a current reinforced traffic light state parameter of a target traffic light that is acquired from a traffic light control end and a current vehicle state parameter of a target unmanned vehicle;

a second action generating module 1202, configured to input the reinforced vehicle state parameter into a second reinforcement learning model, to obtain an unmanned vehicle navigation action matching the reinforced vehicle state parameter;

a second performing module 1203, configured to perform the unmanned vehicle navigation action, to obtain a new vehicle state parameter and a second reward parameter;

a second loss value determining module 1204, configured to determine a second loss value based on the second reward parameter, the new vehicle state parameter and the reinforced vehicle state parameter; and a second training module 1205, configured to train the second reinforcement learning model according to the second loss value.

In the technical solution of the present disclosure, the acquisition, storage, application, etc. of the personal information of a user all comply with the provisions of the relevant laws and regulations, and do not violate public order and good customs.

According to an embodiment of the present disclosure, an electronic device, a readable storage medium and a computer program product are provided.

Figure 13:
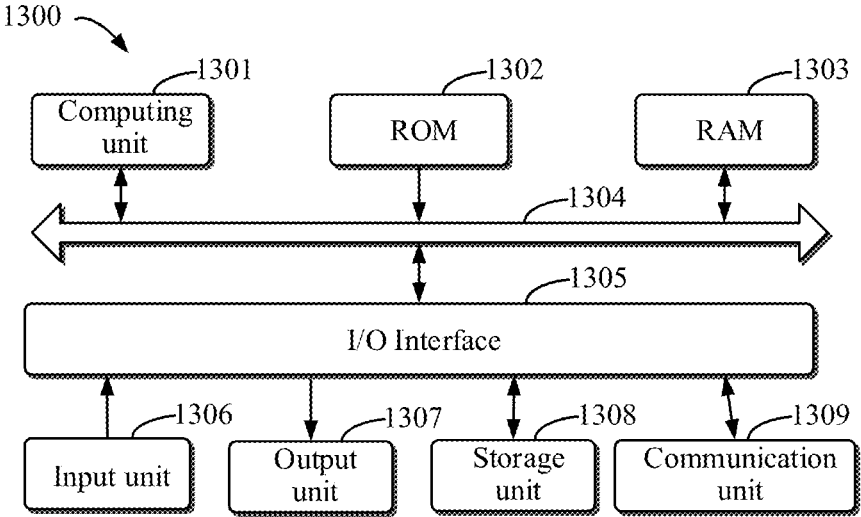
FIG. 13 is a block diagram of an electronic device used to implement the methods according to the embodiments of the present disclosure.

FIG. 13 is a schematic block diagram of an example electronic device 1300 that may be used to implement embodiments of the present disclosure. The electronic device is intended to represent various forms of digital computers such as a laptop computer, a desktop computer, a workstation, a personal digital assistant, a server, a blade server, a mainframe computer, and other appropriate computers. The electronic device may alternatively represent various forms of mobile apparatuses such as personal digital processing, a cellular telephone, a smart phone, a wearable device and other similar computing apparatuses. The parts shown herein, their connections and relationships, and their functions are only as examples, and not intended to limit the implementations of the present disclosure described and/or claimed herein.

As shown in FIG. 13, the device 1300 includes a computing unit 1301, which may execute various appropriate actions and processes in accordance with a program stored in a read-only memory (ROM) 1302 or a program loaded into a random access memory (RAM) 1303 from a storage portion 1308. The RAM 1303 also stores various programs and data required by operations of the system 900. The computing unit 1301, the ROM 1302 and the RAM 1303 are connected to each other through a bus 1304. An input/output (I/O) interface 1305 is also connected to the bus 1304.

A plurality of components in device 1300 are connected to I/O interface 1305, including an input unit 1306, such as a keyboard, mouse, etc; an output unit 1307, such as various types of displays, speakers, etc; a storage unit 1308, such as magnetic disks, optical disks, etc; and communication units 1309, such as network cards, modems, wireless communication transceivers, etc. The communication unit 1309 allows device 1300 to exchange information/data with other devices through computer networks such as the Internet and/or various telecommunications networks.

The computing unit 1301 may be various general-purpose and/or special-purpose processing assemblies having processing and computing capabilities. Some examples of the computing unit 1301 include, but not limited to, a central processing unit (CPU), a graphics processing unit (GPU), various dedicated artificial intelligence (AI) computing chips, various processors that run a machine learning model algorithm, a digital signal processor (DSP), any appropriate processor, controller and microcontroller, etc. The computing unit 1301 performs the various methods and processes described above, for example, the method for controlling a traffic light, the method for navigating an unmanned vehicle, and/or the methods for training models. For example, in some embodiments, method for controlling a traffic light, the method for navigating an unmanned vehicle, and/or the methods for training models may be implemented as a computer software program, which is tangibly included in a machine readable medium, for example, the storage unit 1308. In some embodiments, part or all of the computer program may be loaded into and/or installed on the device 1300 via the ROM 1302 and/or the communication unit 1309. When the computer program is loaded into the RAM 1303 and executed by the computing unit 1301, one or more operations of the above method for controlling a traffic light, the method for navigating an unmanned vehicle, and/or the methods for training models may be performed. Alternatively, in other embodiments, the computing unit 1301 may be configured to perform the method for controlling a traffic light, the method for navigating an unmanned vehicle, and/or the methods for training models through any other appropriate approach (e.g., by means of firmware).

The various implementations of the systems and technologies described herein may be implemented in a digital electronic circuit system, an integrated circuit system, a field programmable gate array (FPGA), an application specific integrated circuit (ASIC), an application specific standard product (ASSP), a system-on-chip (SOC), a complex programmable logic device (CPLD), computer hardware, firmware, software and/or combinations thereof. The various implementations may include: being implemented in one or more computer programs, where the one or more computer programs may be executed and/or interpreted on a programmable system including at least one programmable processor, and the programmable processor may be a specific-purpose or general-purpose programmable processor, which may receive data and instructions from a storage system, at least one input device and at least one output device, and send the data and instructions to the storage system, the at least one input device and the at least one output device.

Program codes used to implement the method of embodiments of the present disclosure may be written in any combination of one or more programming languages. The above program codes may be packaged into a computer program product. These program codes may be provided to a processor or controller of a general-purpose computer, specific-purpose computer or other programmable data processing apparatus, so that the program codes, when executed by the processor 801, cause the functions or operations specified in the flowcharts and/or block diagrams to be implemented. These program codes may be executed entirely on a machine, partly on the machine, partly on the machine as a stand-alone software package and partly on a remote machine, or entirely on the remote machine or a server.

In the context of the present disclosure, the machine-readable medium may be a tangible medium that may include or store a program for use by or in connection with an instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any appropriate combination thereof. A more specific example of the machine-readable storage medium may include an electronic connection based on one or more lines, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination thereof.

To provide interaction with a user, the systems and technologies described herein may be implemented on a computer having: a display device (such as a CRT (cathode ray tube) or LCD (liquid crystal display) monitor) for displaying information to the user; and a keyboard and a pointing device (such as a mouse or a trackball) through which the user may provide input to the computer. Other types of devices may also be used to provide interaction with the user. For example, the feedback provided to the user may be any form of sensory feedback (such as visual feedback, auditory feedback or tactile feedback); and input from the user may be received in any form, including acoustic input, speech input or tactile input.

The systems and technologies described herein may be implemented in: a computing system including a background component (such as a data server), or a computing system including a middleware component (such as an application server), or a computing system including a front-end component (such as a user computer having a graphical user interface or a web browser through which the user may interact with the implementations of the systems and technologies described herein), or a computing system including any combination of such background component, middleware component or front-end component. The components of the systems may be interconnected by any form or medium of digital data communication (such as a communication network). Examples of the communication network include a local area network (LAN), a wide area network (WAN), and the Internet.

A computer system may include a client and a server. The client and the server are generally remote from each other, and generally interact with each other through the communication network. A relationship between the client and the server is generated by computer programs running on a corresponding computer and having a client-server relationship with each other.

It should be appreciated that the steps of reordering, adding or deleting may be executed using the various forms shown above. For example, the steps described in embodiments of the present disclosure may be executed in parallel or sequentially or in a different order, so long as the expected results of the technical schemas provided in embodiments of the present disclosure may be realized, and no limitation is imposed herein.

The above specific implementations are not intended to limit the scope of the present disclosure. It should be appreciated by those skilled in the art that various modifications, combinations, sub-combinations, and substitutions may be made depending on design requirements and other factors. Any modification, equivalent and modification that fall within the spirit and principles of the present disclosure are intended to be included within the scope of the present disclosure.

What is claimed is:

1. A method for controlling a traffic light, applied to a traffic light control end communicating with an unmanned vehicle navigation end, the method comprising:

generating a reinforced traffic light state parameter according to vehicle state representation information of an unmanned vehicle currently contained in a preset area of a target traffic light and a current traffic light state parameter of the target traffic light; and generating, according to the reinforced traffic light state parameter, a traffic light control action matching the reinforced traffic light state parameter, wherein the generating the traffic light control action matching the reinforced traffic light state parameter according to the reinforced traffic light state parameter comprises:

inputting the reinforced traffic light state parameter into a first reinforcement learning model, to obtain the traffic light control action matching the reinforced traffic light state parameter;

wherein the reinforced traffic light state parameter is used to cause the unmanned vehicle navigation end to:

generate a reinforced vehicle state parameter according to the reinforced traffic light state parameter and a current vehicle state parameter of the unmanned vehicle, and generate an unmanned vehicle navigation action matching the reinforced vehicle state parameter according to the reinforced vehicle state parameter, wherein the method further comprises training the first reinforcement learning model, and the training comprises:

generating a sample reinforced traffic light state parameter according to sample vehicle state representation information of a sample unmanned vehicle currently contained in a sample preset area of a sample target traffic light and a sample current traffic light state parameter of the sample target traffic light;

inputting the sample reinforced traffic light state parameter into the first reinforcement learning model, to obtain a sample traffic light control action matching the sample reinforced traffic light state parameter;

performing the sample traffic light control action, to obtain a new traffic light state parameter and a first reward parameter; and determining a first loss value, based on the first reward parameter, the new traffic light state parameter, and the sample reinforced traffic light state parameter; and training the first reinforcement learning model according to the first loss value.

2. The method according to claim 1, wherein the vehicle state representation information is generated by the unmanned vehicle navigation end according to a current vehicle state parameter of the unmanned vehicle contained in the preset area and historical vehicle state representation information at a plurality of previous moments.

3. The method according to claim 1, wherein the generating a reinforced traffic light state parameter according to vehicle state representation information of an unmanned vehicle currently contained in a preset area of a target traffic light and a current traffic light state parameter of the target traffic light comprises:

stitching the vehicle state representation information and the current traffic light state parameter into hybrid environment information; and inputting the hybrid environment information into a first encoder, to obtain the reinforced traffic light state parameter.

4. The method according to claim 1, wherein the generating, according to the reinforced traffic light state parameter, a traffic light control action matching the reinforced traffic light state parameter comprises:

acquiring associated traffic light state aggregation information of associated traffic lights associated with the target traffic light; and generating the traffic light control action matching the reinforced traffic light state parameter, according to the reinforced traffic light state parameter and the associated traffic light state aggregation information.

5. The method according to claim 4, wherein the associated traffic light state aggregation information is generated by:

generating an associated traffic light state matrix according to current traffic light state parameters of the associated traffic lights; and generating the associated traffic light state aggregation information, according to the associated traffic light state matrix, a connectivity parameter of the target traffic light, and a weight matrix of the target traffic light.

6. The method according to claim 5, wherein the generating the associated traffic light state aggregation information, according to the associated traffic light state matrix, a connectivity parameter of the target traffic light, and a weight matrix of the target traffic light comprises:

generating, through a first graph neural network, the associated traffic light state aggregation information according to the associated traffic light state matrix, the connectivity parameter of the target traffic light, and the weight matrix of the target traffic light.

7. The method according to claim 1, wherein, after the generating a reinforced traffic light state parameter according to vehicle state representation information of an unmanned vehicle currently contained in a preset area of a target traffic light and a current traffic light state parameter of the target traffic light, the method further comprises:

inputting the reinforced traffic light state parameter into a pre-trained goal network to obtain a goal vector, wherein the unmanned vehicle navigation end generates, through a second reinforcement learning model, the unmanned vehicle navigation action matching the reinforced vehicle state parameter according to the reinforced vehicle state parameter; and the goal vector is used to cause the unmanned vehicle navigation end to adjust the second reinforcement learning model according to the goal vector.

8. The method according to claim 1, wherein the method further comprises navigating the unmanned vehicle, applied to the unmanned vehicle navigation end communicating with the traffic light control end, the method comprising:

generating the reinforced vehicle state parameter according to the current reinforced traffic light state parameter of the target traffic light that is acquired from the traffic light control end and the current vehicle state parameter of the unmanned vehicle; and generating, according to the reinforced vehicle state parameter, the unmanned vehicle navigation action matching the reinforced vehicle state parameter.

9. The method according to claim 8, wherein, before the generating the reinforced vehicle state parameter according to the current reinforced traffic light state parameter of the target traffic light that is acquired from the traffic light control end and a current vehicle state parameter of the unmanned vehicle, the method further comprises:

generating vehicle state aggregation information, according to the vehicle state parameter of an unmanned vehicle currently contained in a preset area of the target traffic light; and generating the current vehicle state representation information according to the vehicle state aggregation information and historical vehicle state representation information at a plurality of previous moments, wherein the vehicle state representation information is used to cause the traffic light control end to generate the reinforced traffic light state parameter according to the vehicle state representation information of the unmanned vehicle currently contained in the preset area of the target traffic light and the current traffic light state parameter of the target traffic light.

10. The method according to claim 9, wherein the generating vehicle state aggregation information according to a vehicle state parameter of an unmanned vehicle currently contained in a preset area of the target traffic light comprises:

generating, through a second graph neural network, the vehicle state aggregation information according to the vehicle state parameter of the unmanned vehicle currently contained in the preset area of the target traffic light.

11. The method according to claim 9, wherein the generating the current vehicle state representation information according to the vehicle state aggregation information and historical vehicle state representation information at a plurality of previous moments comprises:

inputting the vehicle state aggregation information and the historical vehicle state representation information at the plurality of previous moments into a recurrent neural network, to obtain the current vehicle state representation information; or constructing a linear function according to the historical vehicle state representation information at the plurality of previous moments, and obtaining, through the linear function, the current vehicle state representation information according to the vehicle state aggregation information.

12. The method according to claim 8, wherein the generating, according to the reinforced vehicle state parameter, an unmanned vehicle navigation action matching the reinforced vehicle state parameter comprises:

inputting the reinforced vehicle state parameter into a second reinforcement learning model, to obtain the unmanned vehicle navigation action matching the reinforced vehicle state parameter.

13. The method according to claim 12, further comprising:

adjusting the second reinforcement learning model according to a goal vector, wherein the goal vector is generated by the traffic light control end by inputting the reinforced traffic light state parameter into a pretrained goal network.

14. The method according to claim 1, wherein the inputting the sample reinforced traffic light state parameter into the first reinforcement learning model, to obtain the sample traffic light control action matching the sample reinforced traffic light state parameter comprises:

acquiring associated traffic light state aggregation information of associated traffic lights associated with the sample target traffic light; and inputting the sample reinforced traffic light state parameter and the associated traffic light state aggregation information into the first reinforcement learning model, to obtain the sample traffic light control action matching the sample reinforced traffic light state parameter, wherein the associated traffic light state aggregation information is generated by:

generating an associated traffic light state matrix according to current traffic light state parameters of associated traffic light states; and generating the associated traffic light state aggregation information, according to the associated traffic light state matrix, a connectivity parameter of the sample target traffic light, and a weight matrix of the sample target traffic light, and the determining a first loss value, based on the first reward parameter, the new traffic light state parameter, and the sample reinforced traffic light state parameter comprises:

determining the first loss value based on the first reward parameter, the new traffic light state parameter, a weight matrix corresponding to the new traffic light state parameter, the reinforced traffic light state parameter, and a weight matrix corresponding to the sample reinforced traffic light state parameter, wherein the weight matrices are learned and obtained during the training of the first reinforcement learning model.

15. The method according to claim 7, wherein the method further comprises training the second reinforcement learning model, the training comprising:

generating a sample reinforced vehicle state parameter, according to a current reinforced traffic light state parameter of a sample target traffic light that is acquired from a sample traffic light control end and a sample current vehicle state parameter of a sample target-unmanned vehicle;

inputting the sample reinforced vehicle state parameter into the second reinforcement learning model, to obtain a sample unmanned vehicle navigation action matching the sample reinforced vehicle state parameter;

performing the sample unmanned vehicle navigation action, to obtain a new vehicle state parameter and a second reward parameter;

determining a second loss value, based on the second reward parameter, the new vehicle state parameter and the sample reinforced vehicle state parameter; and training the second reinforcement learning model according to the second loss value.

16. The method according to claim 15, wherein, after the performing the sample unmanned vehicle navigation action to obtain a new vehicle state parameter and a second reward parameter, and before the determining a second loss value based on the second reward parameter, the new vehicle state parameter and the sample reinforced vehicle state parameter, the method further comprises:

determining an additional reward parameter, according to a goal vector, the sample current vehicle state parameter, and an ideal vehicle state parameter predicted by the second reinforcement learning model; and updating the second reward parameter according to the additional reward parameter, wherein the goal vector is generated by the sample traffic light control end by inputting the sample reinforced traffic light state parameter into a pre-trained goal network.

17. An apparatus for controlling a traffic light according to claim 1, comprising:

at least one processor; and a memory, communicating with the at least one processor, wherein the memory stores instructions executable by the at least one processor, and the instructions are executed by the at least one processor, to enable the at least one processor to perform operations comprising:

generating a reinforced traffic light state parameter according to vehicle state representation information of an unmanned vehicle currently contained in a preset area of a target traffic light and a current traffic light state parameter of the target traffic light; and generating, according to the reinforced traffic light state parameter, a traffic light control action matching the reinforced traffic light state parameter, wherein the generating the traffic light control action matching the reinforced traffic light state parameter according to the reinforced traffic light state parameter comprises: inputting the reinforced traffic light state parameter into a first reinforcement learning model, to obtain the traffic light control action matching the reinforced traffic light state parameter;

wherein the reinforced traffic light state parameter is used to cause the unmanned vehicle navigation end to: generate a reinforced vehicle state parameter according to the reinforced traffic light state parameter and a current vehicle state parameter of the unmanned vehicle, and generate an unmanned vehicle navigation action matching the reinforced vehicle state parameter according to the reinforced vehicle state parameter, wherein the method further comprises training the first reinforcement learning model, and the training comprises:

generating a sample reinforced traffic light state parameter according to sample vehicle state representation information of a sample unmanned vehicle currently contained in a sample preset area of a sample target traffic light and a sample current traffic light state parameter of the sample target traffic light;

inputting the sample reinforced traffic light state parameter into the first reinforcement learning model, to obtain a sample traffic light control action matching the sample reinforced traffic light state parameter;

performing the sample traffic light control action, to obtain a new traffic light state parameter and a first reward parameter; and determining a first loss value, based on the first reward parameter, the new traffic light state parameter, and the sample reinforced traffic light state parameter; and training the first reinforcement learning model according to the first loss value.

18. An apparatus for navigating an unmanned vehicle according to claim 8, comprising:

at least one processor; and a memory, communicating with the at least one processor, wherein the memory stores instructions executable by the at least one processor, and the instructions are executed by the at least one processor, to enable the at least one processor to perform the method according to claim 8.

* * * * *